United States Patent
Oron et al.

(10) Patent No.: US 8,082,519 B2
(45) Date of Patent: Dec. 20, 2011

(54) EFFICIENT DISPLAY SYSTEMS AND METHODS

(75) Inventors: Ofir Oron, Modi'in (IL); Gabriel Marcus, Jerusalem (IL); Ofer Ber, Herzelia (IL); Eyal Livne, Kfar Saba (IL)

(73) Assignee: Dolphin Software Ltd., Lod (IL)

( * ) Notice: Subject to any disclaimer, the term of this patent is extended or adjusted under 35 U.S.C. 154(b) by 686 days.

(21) Appl. No.: 12/278,724

(22) PCT Filed: Feb. 7, 2007

(86) PCT No.: PCT/IL2007/000162
§ 371 (c)(1),
(2), (4) Date: Aug. 7, 2008

(87) PCT Pub. No.: WO2007/091259
PCT Pub. Date: Aug. 16, 2007

(65) Prior Publication Data
US 2009/0138817 A1    May 28, 2009

Related U.S. Application Data

(60) Provisional application No. 60/774,612, filed on Feb. 21, 2006.

(30) Foreign Application Priority Data
Feb. 8, 2006   (WO) .................. PCT/IL2006/000154

(51) Int. Cl.
*G06F 3/048*   (2006.01)
*G06F 17/00*   (2006.01)

(52) U.S. Cl. ........ 715/788; 715/765; 715/225; 715/232; 715/238

(58) Field of Classification Search .................. 715/788, 715/765, 232, 238, 253
See application file for complete search history.

(56) References Cited

U.S. PATENT DOCUMENTS

| | | | |
|---|---|---|---|
| 5,880,742 A * | 3/1999 | Rao et al. ........................ | 345/440 |
| 6,292,809 B1 * | 9/2001 | Edelman ......................... | 715/273 |
| 6,484,149 B1 * | 11/2002 | Jammes et al. ............. | 705/26.62 |
| 6,637,016 B1 * | 10/2003 | Gasanov et al. .............. | 716/119 |
| 6,642,945 B1 | 11/2003 | Sharpe | |
| 7,137,063 B2 * | 11/2006 | Agrawal et al. ............... | 715/212 |
| 7,340,677 B2 * | 3/2008 | Cowperthwaite ............. | 715/719 |
| 2001/0040585 A1 * | 11/2001 | Hartford et al. .............. | 345/667 |
| 2002/0049785 A1 * | 4/2002 | Bauchot ........................ | 707/503 |
| 2002/0158876 A1 * | 10/2002 | Janssen ......................... | 345/504 |
| 2004/0117408 A1 * | 6/2004 | Bharadwaj et al. ........... | 707/200 |
| 2005/0091606 A1 * | 4/2005 | Sauermann ................... | 715/788 |
| 2005/0097465 A1 * | 5/2005 | Giesen et al. ................. | 715/700 |
| 2009/0058830 A1 * | 3/2009 | Herz et al. .................... | 345/173 |

* cited by examiner

*Primary Examiner* — Tadeese Hailu
(74) *Attorney, Agent, or Firm* — Oliff & Berridge, PLC

(57) ABSTRACT

Methods and systems for making a more efficient use of a display area for the purpose of displaying items, for example on an Internet store web site. In one embodiment of the invention the items are displayed in rows in a manner which allows for optimization of the number of items per page through the adaptation of the display cell width allocated to each item. In one embodiment of the invention, the readability of the display is enhanced through the use of group separators and/or controlled margins.

25 Claims, 12 Drawing Sheets

EFFICIENT DISPLAY SYSTEMS AND METHODS

CROSS REFERENCE TO RELATED APPLICATIONS

This application claims the benefit of U.S. Provisional Patent Application 60/774,612, titled "Efficient Display Systems and Methods" filed on Feb. 21, 2006 and of PCT application PCT/IL2006/000154, titled "System and Method for Computerized Ordering" filed on Feb. 8, 2006. Said applications are hereby incorporated by reference herein.

FIELD OF THE INVENTION

The invention relates to presentation of items on a page.

BACKGROUND OF THE INVENTION

Today, on online shopping web sites a diversity of products is usually displayed using multiple web pages, each containing a group of items with a common theme. These web pages are usually arranged in a hierarchy. For example, there would be separate web pages corresponding to different hierarchical levels of a regular department store, such as departments, aisles, shelves, sub-shelves, etc.

In order to buy a specific product, the user usually locates a link to the department the product is believed to be in. Clicking the link usually launches a list of the shelves of the department. The user then proceeds to click on the shelf that is most likely to contain the item the user is looking for. Clicking the 'shelf' in many cases provides the user with yet another list of 'subshelves', each sub-shelf having a name which describes a smaller more coherent group of products for sale. Selecting a 'sub-shelf' link may then cause a new web page to load, displaying a list of items for sale.

This list of items for sale is usually comprised of product names, related images, and/or additional information/elements arranged in tables or grid type arrangements that divide the web page into cells. In each cell the product name and sometimes the related image and/or additional information/elements are displayed. For example, the product might be coupled with additional information, such as the product price, a short product description, price per unit information, an assortment of indication icons revealing nutritional information about the product and/or other such values. Displayed elements related to the product may also or instead include interactive elements such as buttons, for example for allowing the user to buy an item, change buying quantity and/or view information about the product. Cells in the above described grid arrangements may or may not be separated with visible grid lines.

Such hierarchies as described above and related product lists are employed by many online shopping sites such as online supermarket stores, electronic equipment stores, office supply stores and so forth.

Online supermarkets typically although not necessarily employ two display methods for displaying groceries for sale (described below as method A and method B):

Method A: Items List

Many online grocery shops display groceries for sale in a list that is divided into rows. Each row in the list usually contains only a single grocery product, including for example the product name, product image and in many cases additional description, informative icons and interactive elements for adding or removing the grocery product to or from the shopping cart.

The result of such a display method is in many cases the display of very few products on the page, for example as allocated by the web site, and/or the use of small images. A lot of display area is 'wasted', since the product image, product name, interactive elements, and/or description of the product only utilize a small portion of the entire available screen, and the next product can only be presented, according to this method, in a new row below the existing row. In a typical online supermarket employing this method a user viewing his computer monitor, on which the web site is displayed, will be exposed to no more than 4 to 6 products at a time.

Method B: Item Tables—Fixed Grid

To display more grocery products per display area, some online stores display several products in a row. In this case the products are usually displayed in a table or a grid system. The name, description and/or related interactive elements of the product are then usually placed above, below or to the right of the product image.

These tables used for displaying the products, have fixed cell width, meaning that all cells in a table, have the same width. For example, fixed cell width tables are commonly used when HTML tables are employed for the layout of the page.

A fixed cell width is inefficient by definition, since a single cell width cannot be optimal for all product images, given a variety of product sizes, and/or a variety of image proportions. For example if an online supermarket website employing display Method B, wants to display all the toothpastes in a single web page, the website will need to accommodate two types of images typically associated with toothpastes. One type of toothpaste image has a horizontal orientation (wide image), meaning that the width of the image is much larger than the height, i.e. the toothpaste box is displayed lying down, making the text on the toothpaste box which runs across the width of the box, readable. On the other hand, another type of toothpaste image, for example for a toothpaste pump or for a plastic bottle of toothpaste, has a vertical orientation (narrow image), meaning that the height of the image is much larger than the width. If cell size is set to be wide enough to display the horizontally oriented images in a minimally accepted size, then this accommodation may mean that the cells displaying the vertically oriented images will have a lot of empty unused space ('white space' herein below), to the right and left of the image. If on the other hand the cell width is set to a narrower size, so as to not waste space on the narrower images, then the images of the horizontally oriented toothpaste boxes, would need to be scaled down considerably to fit the narrow size. Yet another method would be to find an 'optimal' fixed cell size that presents the best compromise between the two different image proportions.

In summary it can be said, that while pages displayed using Method B, display more products than in Method A, per a given web page, the use of the display area is still not optimal in method B because all cell widths used to display the items are fixed. The usage of a fixed cell width causes for example a lot of image display area to be wasted on white spaces, and/or for example requires some images to be displayed smaller in size because a compromise has had to be made to accommodate for different image proportions while at the same time displaying a certain number of products in a row.

SUMMARY OF THE INVENTION

According to the present invention, there is provided a computer-based method for arranging items for display, comprising: providing a plurality of items for arrangement for display on at least one page; and arranging the plurality of items in rows on the at least one page, wherein the arranging on at least one of the pages includes: determining cell widths which differ from one another for at least two items which are arranged on the page, and for at least one row on the page, arranging at least two items on the row.

According to the present invention, there is also provided a computer-based method for arranging items for display, comprising: providing a plurality of items for arrangement on at least one page; and arranging the plurality of items in rows on the at least one page; wherein the arranging on at least one of the pages includes: providing a visible gap between a last item in a group of items arranged on the page and a first item in a neighboring group of items arranged on the page that is not provided between neighboring items in a same group arranged on the page.

According to the present invention, there is further provided a system for arranging items for display, comprising: a database configured to store items; a clustering module configured to provide items which are to be displayed on at least one page, wherein at least one of the provided items is extracted from the database; and an arranger module configured to arrange the plurality of items in rows on the at least one page, wherein at least one row on at least one of the pages includes at least two of the plurality of items, the arranger module including a width module configured for at least one of the pages to determine cell widths which differ from one another for at least two items from the plurality which are arranged on the page.

According to the present invention, there is still further provided a system for arranging items for display, comprising: a database configured to store items; a clustering module configured to provide items which are to be displayed on at least one page, wherein at least one of the provided items is extracted from the database; and an arranger module configured to arrange the items in rows on the at least one page, wherein the arranger module includes a group divider module configured for at least one of the pages to provide a visible gap between a last item in a group of items arranged on the page and a first item in a neighboring group of items arranged on the page that is not provided between neighboring items in a same group arranged on the page.

According to the present invention, there is provided a computer-based method for arranging items for display, comprising: providing a plurality of items for arrangement for display on at least one web page, wherein at least one of the items is being offered for a transaction; and arranging the plurality of items in rows on the at least one page, wherein the arranging on at least one of the pages includes: determining cell widths which differ from one another for at least two items which are arranged on the page, providing a visible gap between a last item in a group of items arranged on the page and a first item in a neighboring group of items arranged on the page that is not provided between neighboring items in a same group arranged on the page, and for at least one row on the page, arranging at least two items on the row.

According to the present invention, there is also provided a program storage device readable by machine, tangibly embodying a program of instructions executable by the machine to perform method steps for arranging items for display, comprising: providing a plurality of items for arrangement for display on at least one page; and arranging the plurality of items in rows on the at least one page, wherein the arranging on at least one of the pages includes: determining cell widths which differ from one another for at least two items which are arranged on the page, and for at least one row on the page, arranging at least two items on the row.

According to the present invention, there is further provided a computer program product comprising a computer useable medium having computer readable program code embodied therein for arranging items for display, the computer program product comprising: computer readable program code for causing the computer to provide a plurality of items for arrangement for display on at least one page; and computer readable program code for causing the computer to arrange the plurality of items in rows on the at least one page, wherein the arranging on at least one of the pages includes: determining cell widths which differ from one another for at least two items which are arranged on the page, and for at least one row on the page, arranging at least two items on the row.

According to the present invention, there is still further provided a program storage device readable by machine, tangibly embodying a program of instructions executable by the machine to perform method steps for arranging items for display, comprising: providing a plurality of items for arrangement on at least one page; and arranging the plurality of items in rows on the at least one page; wherein the arranging on at least one of the pages includes: providing a visible gap between a last item in a group of items arranged on the page and a first item in a neighboring group of items arranged on the page that is not provided between neighboring items in a same group arranged on the page.

According to the present invention, there is provided a computer program product comprising a computer useable medium having computer readable program code embodied therein for arranging items for display, the computer program product comprising: computer readable program code for causing the computer to provide a plurality of items for arrangement on at least one page; and computer readable program code for causing the computer to arrange the plurality of items in rows on the at least one page; wherein the arranging on at least one of the pages includes: providing a visible gap between a last item in a group of items arranged on the page and a first item in a neighboring group of items arranged on the page that is not provided between neighboring items in a same group arranged on the page.

According to the present invention, there is also provided a program storage device readable by machine, tangibly embodying a program of instructions executable by the machine to perform method steps for arranging items for display, comprising: providing a plurality of items for arrangement for display on at least one web page, wherein at least one of the items is being offered for a transaction; and arranging the plurality of items in rows on the at least one page, wherein the arranging on at least one of the pages includes: determining cell widths which differ from one another for at least two items which are arranged on the page, providing a visible gap between a last item in a group of items arranged on the page and a first item in a neighboring group of items arranged on the page that is not provided between neighboring items in a same group arranged on the page, and for at least one row on the page, arranging at least two items on the row.

According to the present invention, there is further provided a computer program product comprising a computer useable medium having computer readable program code embodied therein for arranging items for display, the computer program product comprising: computer readable program code for causing the computer to provide a plurality of items for arrangement for display on at least one web page, wherein at least one of the items is being offered for a transaction; and computer readable program code for causing the computer to arrange the plurality of items in rows on the at least one page, wherein the arranging on at least one of the pages includes: determining cell widths which differ from one another for at least two items which are arranged on the page, providing a visible gap between a last item in a group of items arranged on the page and a first item in a neighboring group of items arranged on the page that is not provided between neighboring items in a same group arranged on the page, and for at least one row on the page, arranging at least two items on the row.

BRIEF DESCRIPTION OF THE DRAWINGS

These and other objects, features and advantages of the present invention will be apparent from a consideration of the following Detailed Description of the Invention when considered with the drawing Figures, in which.

DESCRIPTION OF THE PREFERRED EMBODIMENTS

Figure 1A:
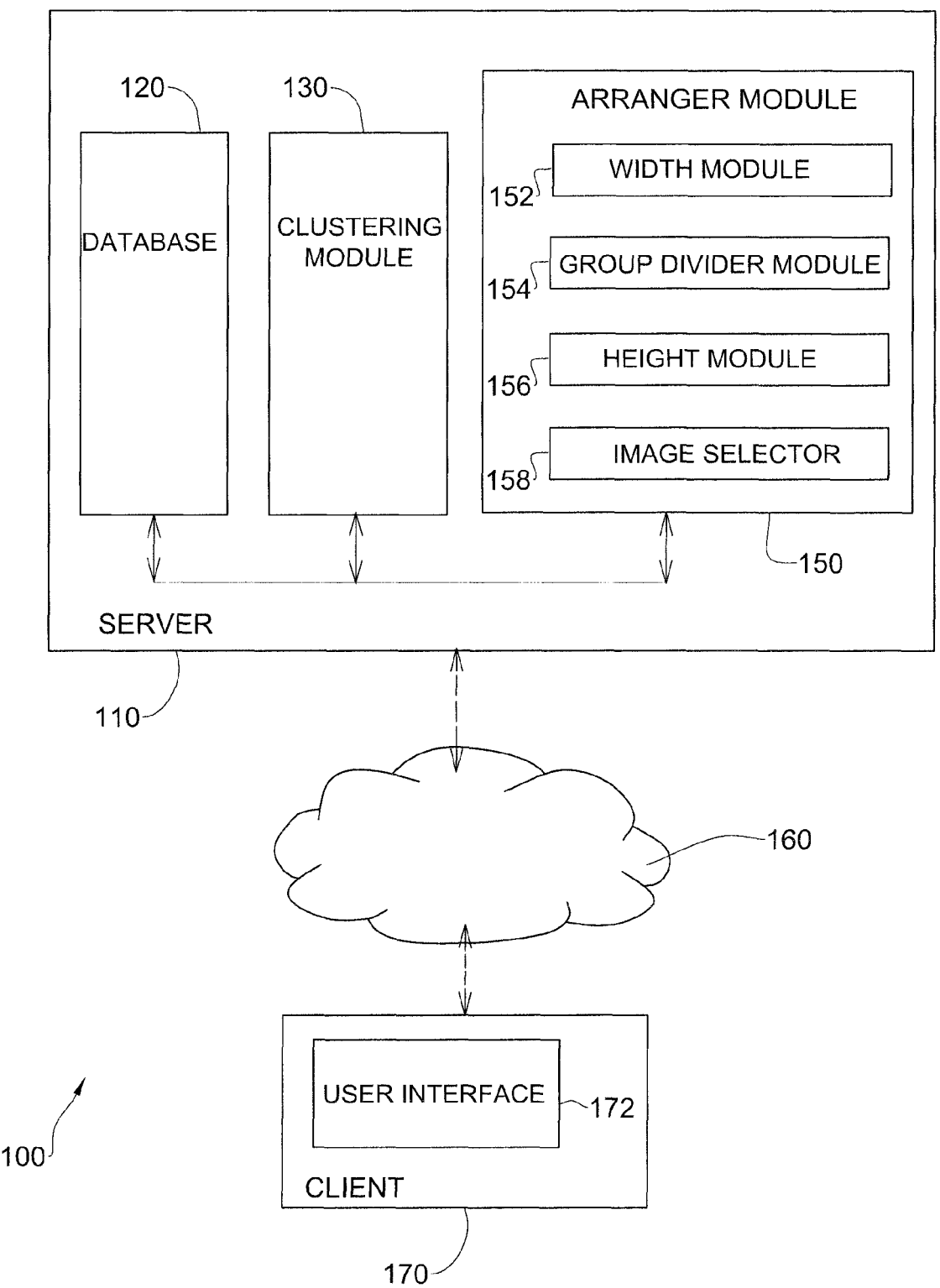
FIG. 1A is a block diagram of a system for optimal usage of a display area, according to an embodiment of the present invention.

Described herein are embodiments of the current invention for efficient display systems and methods.

As used herein, the phrase "for example," "such as" and variants thereof describing exemplary implementations of the present invention are exemplary in nature and not limiting.

Reference in the specification to "one embodiment", "an embodiment", "some embodiments", "another embodiment", "other embodiments" or variations thereof means that a particular feature, structure or characteristic described in connection with the embodiment(s) is included in at least one embodiment of the invention. Thus the appearance of the phrase "one embodiment", "an embodiment", "some embodiments", "another embodiment", "other embodiments" or variations thereof do not necessarily refer to the same embodiment(s).

The term "cell" as used herein refers to a unit (for example an area defined in pixels) for holding and/or displaying one or more of the following element(s) inter-alia relating to one or more item(s): item(s), item image(s), item name(s), item related description(s), item related inter-active element(s), item-related layout elements, and any other item related element(s) in any format. A cell may or may not be visually delineated, for example with visible grid lines. The invention does not limit the meaning of the term "item". For example items can include, inter-alia: products, services, advertisements, group separators and/or any other items.

In one embodiment, an item cell may comprise a plurality of sub-cells, each for holding one or more of the item related elements, whereas in another embodiment there may not be a sub-cell structure. For simplicity's sake, the description below refers to an item cell for holding the item related elements and should be understood to include both embodiments with a sub-cell structure and embodiments without a sub-cell structure.

Embodiments below refers to processing an item (for example arranging, grouping, displaying etc) for simplicity of description. However it should be understood that processing an item includes the processing of any one or more elements relating to that item.

The present invention is primarily disclosed as a method and it will be understood by a person of ordinary skill in the art that an apparatus such as a conventional data processor incorporated with a database, software and other appropriate components may be programmed or otherwise designed to facilitate the practice of the method of the invention.

Unless specifically stated otherwise, as apparent from the following discussions, it is appreciated that throughout the specification discussions, utilizing terms such as, "providing", "arranging", "checking", "redistributing", "determining", "selecting", "dividing" or the like, refer to the action and/or processes of any combination of software, hardware and/or firmware. For example, in one embodiment a computer, processor or similar electronic computing system may manipulate and/or transform data represented as physical, such as electronic, quantities within the computing system's registers and/or memories into other data, similarly represented as physical quantities within the computing system's memories, registers or other such information storage, transmission or display devices.

Embodiments of the present invention may use terms such as, processor, device, system, computer, apparatus, system, sub-system, module, component etc, (in single or plural form) for performing the operations herein. These terms, as appropriate, refer to any combination of software, hardware and/or firmware configured to perform the operations as defined and explained herein. The module(s) (or counterpart terms specified above) may be specially constructed for the desired purposes, or it may comprise a general purpose computer selectively activated or reconfigured by a program stored in the computer. Such a program may be stored in a readable storage medium, such as, but not limited to, any type of disk including optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, any other type of media suitable for storing electronic instructions that are capable of being conveyed, for example via a computer system bus.

The method(s)/processe(s)/module(s) (or counterpart terms for example as specified above) and screen(s) presented herein are not inherently related to any particular system or other apparatus, unless specifically stated otherwise. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

One embodiment of the invention relates to making efficient use of a display area for the display of items, for example on online shopping websites. For example an online shopping website may present a store inventory to online shoppers (business or consumer oriented shopping), on a monitor (screen) of a personal computer, on a screen of a mobile (cellular) phone, on a screen of a personal digital assistant PDA or on other such viewing means. In one embodiment, the total area available for displaying items on a page may be determined, for example by the amount of pixels available on a screen, for example by a fixed number of pixels predefined for example by a system of the invention, and/or for example by other factors influencing the available display area (as will be explained in more detail below). More specifically, some embodiments of the invention teach methods and systems for optimizing the number of displayed items per page (where the page is the display area) given a set of item images and/or other item related elements. In one of these embodiments, the optimal number takes into account the desirability of also providing a pleasing and/or efficient display for the user to read. A page should be understood herein to refer to a totality of content and functionality which is accessible to a user at a particular point in time. For example a web page includes all content and functionality which can potentially be displayed by a browser at a particular point in time (including both content which is displayed on the screen and content which is hidden from view but is accessible by scrolling). The user should be understood herein to refer to one who views the page.

Referring now to the drawings, FIG. 1A illustrates a system 100 for optimal usage of a display area (i.e. for optimizing the displaying on a page), according to an embodiment of the invention. System 100 includes server 110 which includes an image database 120 for storing inter-alia one or more images of each displayable item, when available, an optional clustering module 130 configured to determine the "cluster" of items to be displayed on each page, and an arranger module 150 configured to arrange items on a page. For simplicity of description, it is assumed that each cluster is displayed on one page, however it is possible that in some embodiments an entire cluster may not fit on one page and therefore the cluster is displayed on more than one page. In these embodiments, similar methods as those described below may be applied, mutatis mutandis.

Arranger module 150 can include for example one or more of the following inter-alia: an image selector 158 configured to select among more than one stored images in database 120 for a particular item, a width module 152 configured to determine and generate an appropriate cell width for a particular item or items and configured to determine whether a particular row's width can accommodate the item(s), a group divider module 154 configured to group the items to be displayed on the page (including for example any of the following functions inter-alia: dividing items into groups, arranging the groups of items in order, arranging the items within a group in order and/or placing separators between groups), and/or a height module 156 configured to determine and generate an appropriate height for a row or for a particular cell within a row (for example by splitting a vertical space in a row into a plurality of cells, or vertically merging a plurality of cells occupying more than one row into one cell). As will be described in more detail below, there may be embodiments of arranger module 150 which do not necessarily include all of modules 152, 154, 156, and 158.

As illustrated in FIG. 1A, server 110 is connected through a network 160, for example including the Internet, to a client 170. Client 170 may be any user device including a screen, for example a computer, PDA, cellular phone, etc. Client 170 includes for example a user interface 172 configured to receive inputs from a user and provide outputs to a user including displaying on a screen (i.e. user interface 172 includes a screen). Client 170 in one embodiment includes an application for communicating with server 110, for example a web browser.

Figure 1B:
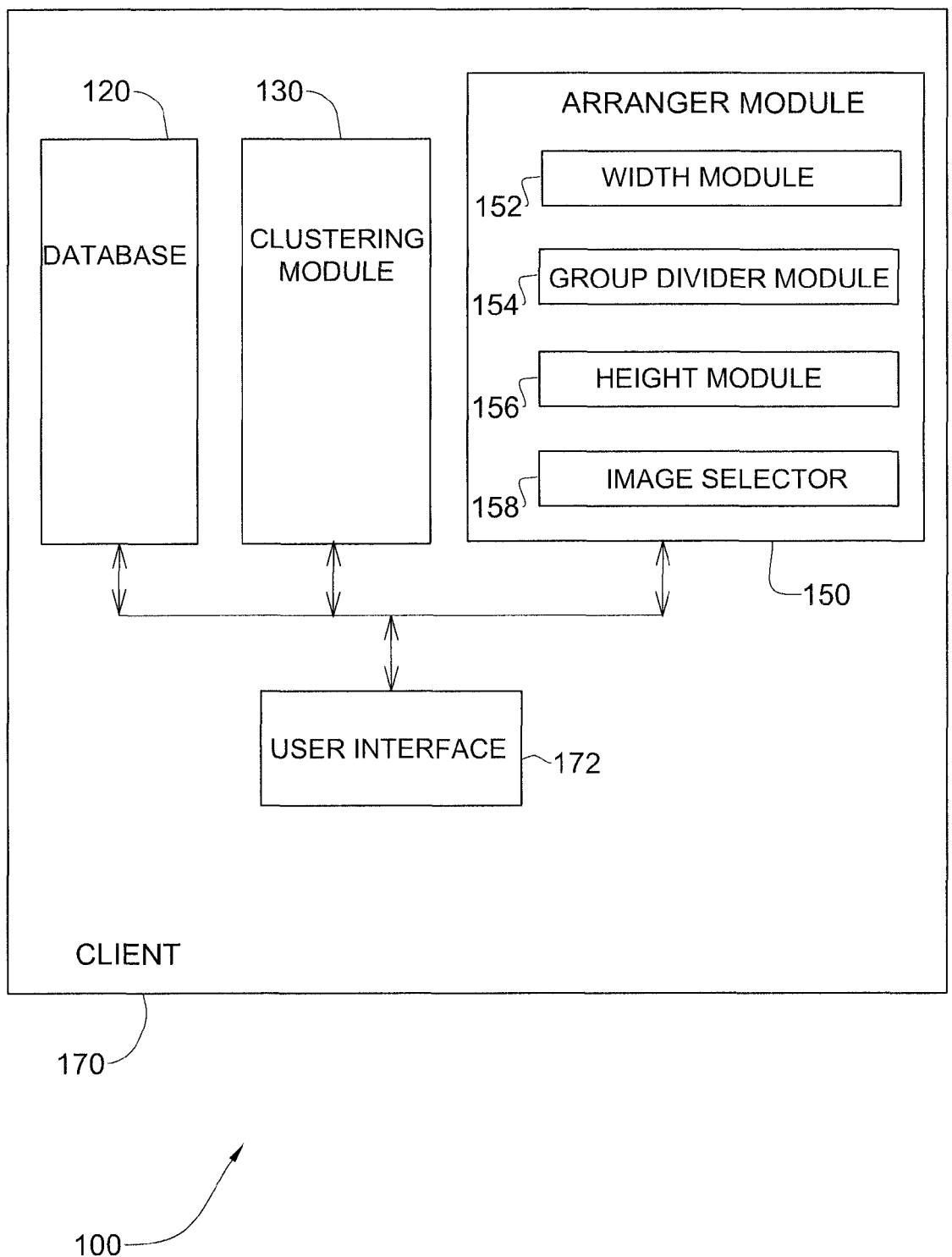
FIG. 1B is a block diagram of a system for optimal usage of a display area, according to another embodiment of the present invention.

FIG. 1B illustrates system 100 for optimal usage of a display area (i.e. for optimizing the displaying on a page), in accordance with another embodiment of the invention. In this embodiment, the functionality of database 120, optional clustering module 130 and arranger module 150 are provided by client 170, for example by an application on client 170. For example if client 170 is a personal computer PC, the application can be a PC application.

In yet another embodiment, system 100 may have the functionality of database 120, optional clustering module 130 and arranger module 150 divided between a server and a client.

The division of the functionality of system 100 into the modules shown in FIG. 1A or FIG. 1B is for illustration purposes only, and in other embodiments the functionality may be provided by less modules, more modules and/or different modules. Each module of system 100 may be made up of any combination of software, hardware and/or firmware that performs the functions as defined and explained herein. Database 120, (optional) clustering module 130 and arranger module 150 may be centralized in one location or dispersed over more than one location, depending on the embodiment. For example, database 120 in one embodiment is located remotely from arranger module 150. In other embodiments of the invention, the functionality of system 100 described herein may be divided differently into the modules of FIG. 1A or 1B, and/or system 100 may include additional or less functionality than described herein. In other embodiments of the invention, any module illustrated in FIG. 1A or 1B may include less, more or different functionality than described herein.

Although for simplicity of description database 120 is referred to herein in the single form, in some embodiments database 120 may comprise a plurality of databases, together providing the functionality described herein below. Now will be described exemplary embodiments of the structure and/or contents of database 120, but it should be understood by the reader that the invention is not limited to the exemplary embodiments described herein.

In some embodiments of the invention database 120 stores item images, when available. In some of these embodiments, database 120 stores item images without any margins included in them (as is the case with many displayed images in current web sites). In one of these embodiments all margins are added and controlled by system 100, according to one or more predetermined criteria (for example limiting the use of margins to any necessary minimum, hence wasting less display area as will be described in more detail below).

In one embodiment uniform margins are added to each item image when determining the cell width needed for displaying the image (see below). In another embodiment, adaptable margins are added to each item image. In another embodiment, no margins are added to each item image.

In one embodiment of the invention, the image format used to store images in database 120 includes the image width as part of the file format. For example JPEG, GIF and BMP formatted images may include the image width. In another embodiment, the image width can be stored separately within database 120. In another embodiment the image width is not stored in database 120, and the image width may be determined in real time as will be described in more detail below.

In one embodiment of the invention, the image format used to store images in database 120 includes the image height as part of the file format. For example JPEG, GIF and BMP formatted images may include the image height. In another embodiment, the image height can be stored separately within database 120. In another embodiment, the image height is not stored in database 120, and the image height may be determined in real time as will be described in more detail below.

In some embodiments of the invention, database 120 includes other information on items (in addition to or instead of item images), for example any of the following inter-alia: assignments of an item to one or more page(s), one or more cluster(s) and/or to one or more groups, attributes which allow an item to be placed on appropriate page(s), in appropriate cluster(s) and/or in a appropriate group(s), and/or attributes which determine when a particular image out of a plurality of stored images for an item should be displayed (and/or that no image should be displayed). For example in one of these embodiments, each item has stored assignments(s) (i.e. preset definition(s)) indicating the page(s), cluster(s) or groups where the item is to be placed. As another example in some of these embodiments, each item has stored attribute(s) which allows the item to be placed in the page(s), cluster(s) and/or group(s) to which the item belongs (optionally varying under different circumstances), so that the item can be displayed on the corresponding page(s) or with the corresponding cluster(s) and/or group(s). Continuing with the example, in one of these embodiments each page, cluster and/or group has a related rule/query which allows a dynamic determination of whether an item should appear in the page, cluster and/or group. Continuing with this embodiment, for example the organic group of products may include all items that have the item attribute "organic" set to "yes". As another example, in one of these embodiments, database 120 includes a planogram cross-referencing page(s), clusters, groups and/or items. Continuing with the example, in one embodiment a planogram can include a fixed list of departments, shelves and/or sub-shelves and the included items. As another example, in some of these embodiments a combination of any of the above approaches may be used. For example in one of these embodiments, there is a planogram which lists for each cluster which groups belong in the cluster and each item includes an assignment to a particular group. As another example, in one of these embodiments, items may be assigned to page(s), cluster(s) and/or group(s) and also have attributes which allow dynamic allocation to possibly other page(s), cluster(s) and/or group(s). More information on clusters and groups will be provided further below with reference to FIG. 7.

In one embodiment, database 120 includes in addition or instead attributes which correspond to item related elements to be displayed in an item cell. For example the item related elements which may correspond to stored attributes can include inter-alia: item name(s) and item description(s). Depending on the item description and/or embodiment, a particular description may be displayed in any format, for example as text (of uniform or varying font) or as an icon.

Examples of item descriptions include any of the following inter-alia: health-related (for example item contents, allergy information, organic, diabetics-approved, etc.), social-related (for example kosher certification, halal certification, approved by the European Union or any other organization, socially responsible, country of origin, FairTrade [i.e. non-exploitive to producers from developing countries], blacklist/ socially irresponsible etc.), quality related (medals, ribbons, rating, recommended by other users, recommended by professionals), availability (for example in stock, out of stock, number of remaining items in stock, predicted availability, etc.), money-related (for example price, price per unit, on sale, reduced price, good price, not good price, lowest price over time, lowest price among competitors, etc), personal-related (for example on favorites list [items user likes and/or wants to buy], on black lists [items user dislikes and/or doesn't want to buy], recent purchase, in shopping cart, thumbs up/down, etc), advertisements related to the item (for example this item goes well with another item, etc), etc.

In one embodiment some item related elements corresponding to stored attributes are only selectively arranged for display and displayed for an item. Therefore in this embodiment, labeling may be customized for the user. For example item descriptions indicating kosher certification, organic certification, and/or approval by an organization centered in a geographical area may or may not be displayed, for example based on a user characteristic (for example user preference which may be explicitly stated by the user, stored in database 120 and/or derived by system 100). Continuing with the example, if one shopper only buys kosher organic food and lives in Europe, whereas a second shopper does not, then in one embodiment descriptions indicating kosher certification, organic certifications and European Union are displayed to the first shopper but not to the second. In another embodiment, all item related elements corresponding to stored attributes are displayed for an item, or as many as can fit in the item cell, are displayed.

In some embodiments, an item related element may or may not be arranged for display and displayed based on a comparison between item attribute(s) (for example corresponding to the item name) and a user characteristic such as a personal user list(s) of item names (for example list of favorite items, personal blacklists, list of recent purchases, list of thumbs up/thumbs down items), where the personal user list(s) of item names can for example be stored in database 120. For example, in one of these embodiments if the name of an item which is being arranged for display appears on the favorites list of a user, then the item cell may include an indication of the item being a favorite, such as a star.

In some embodiments of the invention, there are item related elements which are displayed in an item cell which do not necessarily correspond to attributes stored for the item in database 120. For example in some of these embodiments, the same interactive element(s) may be displayed in each item cell and therefore in one of these embodiments it may not be necessary to store attribute(s) corresponding to the same interactive element(s) separately for each item.

In some embodiments, items may be displayed differently under different circumstances. For example, in one embodiment items which have already been bought are highlighted on a browsing page. As another example, in one embodiment, items on sale and/or new items may be more prominently displayed, for example with a larger minimum cell width.

For simplicity of description, it is assumed herein below that there is one item per cell and that at most one image of an item is displayed per cell. However in other embodiments of the invention there may be more than one item per cell and/or more than one item image per cell, and similar methods to those described below may be applied mutatis mutandis. For example, in one of these embodiments, the cell width may take into account the size of elements related to any of the items which are to be displayed in that cell.

Unless otherwise specified, one or more of the methods described below (200, 500, 600, 700 and/or 1000) may be executed by system 100 in any configuration (for example the configuration illustrated in FIGS. 1A and/or 1B). One or more of the methods described below (200, 500, 600, 700 and/or 1000) may be used for preparing a display of items in any type of page.

In one embodiment, for example, system 100 may pertain to an online shopping site such as an online supermarket, electronic equipment store, office supply store, etc and at least some of the items displayed are products or services offered for a transaction (for example for sale, for exchange, or for any other transaction). In this embodiment one or more of methods 200, 500, 600, 700 and/or 1000 can be used when preparing a browsing (shopping) page, a trolley/shopping cart page, a "favorites" pages and/or any other pages which display the items offered to a shopper. The invention is not bound to a shopping application and in other embodiments pages may be prepared for displaying items that are not necessarily being offered for sale, for exchange or for any other transaction.

Figure 2:
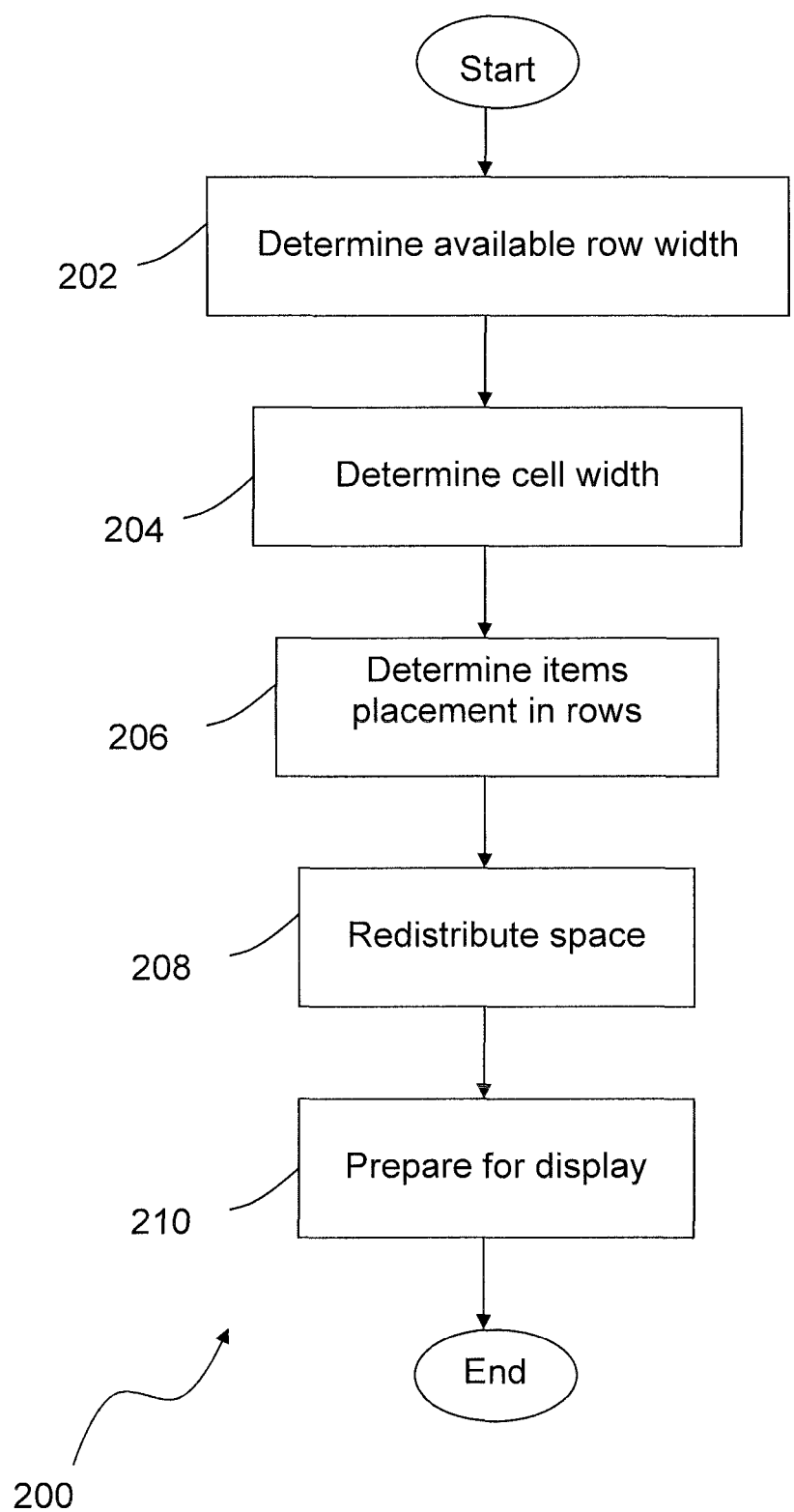
FIG. 2 is a flowchart of a method for arranging items in rows, according to an embodiment of the present invention.

FIG. 2 is a flowchart of a method for arranging items in rows on a page (where the page is considered a display area), according to an embodiment of the present invention. The invention is not bound by the specific stages or order of the stages illustrated and discussed with reference to FIG. 2. For example, in one embodiment stage 202 and 204 can be performed in any order or simultaneously.

Before any items are arranged in a row, in stage 202, system 100, for example width module 152 of arranger module 150, determines (i.e. becomes aware of) the available row width that arranger module 150 will be able to use for arranging items for display in that row. In one embodiment, available row width is set in pixels.

In some embodiments, the available row width is preset, whereas in other embodiments the available row width is set dynamically by system 100. For example, assuming a client 170—server 110 configuration as in FIG. 1A, the available row width may be set by client 170 or server 110, depending on the embodiment.

For example, in some embodiments available row width may be preset or set dynamically by system 100 independently of the actual screen width at client 170, and/or without the constraint of necessarily being less than or equal to the actual width of the screen. (In one of these embodiments actual screen width is the maximum number of pixels which a screen at client 170 is configured to display horizontally for a given screen resolution). For example, in one of these embodiments, the row width may in some cases be larger than the actual screen width and a horizontal scroll or other scrolling mechanism can be added if necessary. As another example, in one of these embodiments the row width may be a fixed number of pixels irrespective of the actual screen width of client 170, i.e. the row width is not increased or decreased for larger or smaller screen widths respectively. In one of these embodiments, when presetting the available row width or dynamically setting the available the row width independently of the actual screen width, desirable margins to the left and/or right of a row (for example based on the average or assumed screen width) and/or fixed location articles may be taken into account.

As another example, in some embodiments the available row width is dynamically set so as to be equal to or less than the actual width of the screen. For example in one of these embodiments, the available row width may be set to the actual width of the screen. As another example, in one of these embodiments the available row width may be calculated by subtracting from the screen width an amount for margin(s) (to the left and/or to the right of the row), for example 10%. As another example, in one of these embodiments the available row width may be calculated by subtracting from the actual screen width an amount for any article(s) with a fixed display location(s) that overlaps with the row in addition to or instead of margins. (The term "article" in the description is used to distinguish an object that is not fit into rows by arranger module 150). Continuing with the example, advertisements may have fixed display locations, and therefore the row width available for item arrangement and display in one of these embodiments would not include the space occupied by any fixed advertisements in that row. (As mentioned above, advertisements do not necessarily have fixed display locations and may alternatively be fit into rows as any other items). Assuming a browser running on client 170, in one embodiment the browser or an application running within the browser may set the available row width based on the actual screen width.

As another example, in one embodiment, a dynamically set available row width may be partly based on the actual screen width. For example the available row width may be set to be the actual screen width (optionally minus an amount for margins and/or fixed articles) or to a predetermined (fixed) number of pixels, whichever is smaller.

Depending on the embodiment, the available row width may be constant for each row on a page or may vary. For example in an embodiment with fixed location articles in certain rows, the row width may vary for different rows on a page. As another example, the margins for different rows may vary or the margins for all rows may be constant.

The timing of performing stage 202 is not limited by the invention. For example in one embodiment, system 100, for example width module 152 of arranger module 150, determines (i.e. becomes aware of) the available row width(s) (whether constant or variable) for all rows on the page, prior to arranging any items in rows. As another example in another embodiment, the available row width(s) for all rows (whether constant or variable) need not necessarily be known prior to arranging any items in rows, as long as the width of each row is known prior to arranging items in that row.

In stage 204 cell widths of items are determined, in order to calculate how many items can fit in each row. For simplicity of explanation of stage 204 it is assumed that it is known which (cluster of) items are to be displayed on the page. In one embodiment the determination of which items are to be displayed follows method 700 of FIG. 7 discussed below but in other embodiments other appropriate methods may be used for determining which items are to be displayed on the page. For cell width determination, system 100, for example width module 152 of arranger module 150, uses images and/or other item related elements and related width data. As mentioned above, in one embodiment database 120 can store an image format which includes the image width as part of the file format, in which case the arranger module 150 can be directed in stage 204 to utilize the stored image width within the file format for its calculations. In another embodiment, the width of any given image could have been computed by counting the number of pixels within the image, and the width could have been stored in database 120, for example when the image was originally stored in database 120. In this embodiment, in stage 204, arranger module 150 could have retrieved the stored width from database 120. In another embodiment, the image width is not stored in database 120 and in stage 204 arranger module retrieves each image and dynamically (i.e. in real time) calculates the width of the image, for example by counting the number of pixels within the image.

Note that in cases where more than one image is stored per item not necessarily of the same width (for at least some of the items to be displayed on the page), system 100, for example selector module 158 of arranger module 150 can choose the appropriate image (and optionally the corresponding width) based on rules. The rules can be stored in database 120 and/or can be based on the requirements of the user and/or system 100.

In one embodiment there may be a rule that an item image is selected by selector module 158 which best portrays the relative size of the item compared to other items to be displayed on the same page (and/or for example based on another item characteristic). For example, assume that attributes such as length, height and/or width are stored for each item in database 120 and that each item has "n" images stored in database 120, with each of the "n" images of different predetermined dimensions. Arranger module 150 may in one embodiment divide the items to be displayed on the page into "n" size ranges based on the stored attributes, and for each item select the image corresponding to the size range including that item (for example if a particular item is in the third largest relative size group, then the third largest image for that item is selected). As another example, assuming that two items are the same product but that the first item is a larger quantity (for example weight) of the product than the second item, the selected image for the first item may be larger than the selected image for the second item.

In some embodiments there may be a rule that an item image is selected by selector module 158 additionally or alternatively which is appropriate for the user (i.e. based on a characteristic of the user). For example, in one of these embodiments, the image of a product item which includes packaging labeling customized to the user (i.e. customized labeling) may be selected. Continuing with the example, the selected image may include packaging in the appropriate language, may show appropriate certification, may show appropriate geographically limited special offer, etc. As another example, in one of these embodiments, if an item is an advertisement or a group separator, then the selected image of the advertisement or group separator may have customized labeling for the user, for example by being be in the appropriate language for the user.

In some embodiments, there may be a rule that an item image is selected additionally or alternatively which is appropriate to system 100 and/or the application, for example appropriate to client 170. For example the image may be selected taking into account the actual screen width at client 170, or the type of client 170. Continuing with the example, in one of these embodiments, the image selected for a cellular telephone or PDA client 170 with a small screen may be smaller than the image selected for a computer client 170 with a large screen.

In another embodiment, the selection of an image for an item (from among more than one image) may be predefined, for example manually.

In one embodiment, the usage of a particular stored image for an item (regardless of whether that image is the only one stored for the item, or the image was selected from among a plurality of stored images), consequently implies that the width of the displayed image is identical to the width of the used stored image. In another embodiment, the used stored item image (regardless of whether the used image is the only one stored for that item or is the one selected out of a plurality of stored images) may be rescaled (i.e. resized). For example, the resizing may be based on rules, for example based on relative size (and/or other item characteristic(s)), user, application and/or system characteristics (for example based on similar rule(s) to those described above with reference to selection of one image out of a plurality of images). Therefore in this other embodiment the width of the displayed image is not necessarily identical to the width of the used stored item image. In the discussion below regarding the determination of the cell width with reference to the image width, the image width refers to the width of the displayed image which may or may not be identical to the stored image width.

If there is no image selection, then in one embodiment image selector 158 may be omitted from arranger module 150.

In some embodiments there may be no available item image for one or more items to be displayed on the page. In one of these embodiments, when there is no available item image, an appropriate icon is used which indicates that no image is available. In another of these embodiments, when there is no available item image, text may be used which indicates that no image is available. In some of these embodiments, the width of the icon or text is substituted for the image width when determining the cell width as described below.

In one embodiment the cell width is set to be equal to the image width. However in other embodiments, factors other than the item image width may affect cell width. For example in some of these other embodiments, there is a minimum cell width. In many cases, as mentioned above, the cell for an item includes item related elements in addition to the image, for example item name, written description such as price and price per unit, etc, one or more interactive elements (such as buttons or links, to allow a user to perform operations such as add product to cart, remove product from cart, view product information and the like), etc. It is therefore an option in some implementations of system 100 to preset a minimum width for each cell, to make sure, that even if the image is narrow in width, there is yet enough space to display all the related elements. For example, in some of these other embodiments the minimum cell width may be predefined by system 100 based on expected or known width of item related elements. Continuing with the example in one of these other embodiments if one or more interactive elements are present in each cell, the minimum cell width may be predefined based on the width of the interactive elements. Still continuing with the example, in one of these other embodiments the minimum width may be predefined additionally or alternatively based on average line length of item name/description. As another example, the minimum cell width may be based on expected or known width of item related elements with additional width for margin(s) (i.e. empty space at the beginning (i.e. left) and/or end (i.e. right) of the cell). Therefore in some of these implementations, the cell width for an item determined in stage 204 will be based either on the image width or the minimum width, whichever is larger.

Depending on the embodiment, the minimum cell width may be fixed or variable. In some embodiments with a variable minimum cell width, the minimum cell width may vary for different items and/or may vary for a given item based on the item attributes. For example, in one of these embodiments the minimum cell width for an item on sale may be larger than the minimum cell width for an item not on sale.

In some embodiments where factors other than item image width may impact on the cell width, layout factors may affect cell width. For example as mentioned above, in some of these embodiments uniform or adaptable margins may be added to the width of the item image when determining the cell width. In one of these embodiments, the cell width will be the larger of the minimum cell width or the width of the image plus added margin(s) (to the left and/or to the right of the image). In another of these embodiments, the cell width will be the image width plus added margins.

In some embodiments where factors other than item image may impact on the cell width, the determination of cell width in stage 204 may be based on the widest of a plurality of item related elements, for example the widest of the image, interactive element(s) etc, item description icons, etc. (For simplicity of description of item cell width it is assumed that no two item related elements for an item are arranged side by side, however it should be understood that in embodiments where item related elements for an item can be arranged side by side, then the width of the "widest" item related element may in some cases equal the width of more than one item related element that is arranged side by side). Depending on the embodiment the widths of these item related elements may be stored in database 120 and/or determined in real time (for example by counting the number of pixels occupied by the element). In some of these embodiments, there may be other item related elements which are not considered when determining cell width. For example in one of these embodiments, item name (in text) and/or description(s) (in text) may not be considered when determining cell width for an item and any line of text which is wider than the cell width causes the cell height to be increased (i.e. text wrapping where the text is continued on a new line causing the cell to be taller)—see below for more details on cell height. In some of these embodiments, the cell width determined in stage 204 is the greater of the minimum cell width and the width of the widest of the plurality of image elements (optionally plus additional width for margin(s) at the beginning and/or at the end of the cell).

In some embodiments there is a maximum cell width. For example, in one of these embodiments the cell width may not exceed the available row width. In another embodiment there is no maximum cell width.

The timing of performing stage 204 is not limited by the invention. In one embodiment, the cell width is determined for all items on the page, prior to arranging any items in rows. In another embodiment the cell width is determined for as many items as expected to fit in a row prior to arranging any items in that row. In another embodiment, the cell width is determined for each item prior to arranging that item in a row. In another embodiment, the cell widths for all items in a group (for example as grouped by method 700) may be determined prior to arranging the items in the group. In another embodiment, the determination of cell widths for items may proceed independently of the timing of arrangement of items on the page, etc.

In stage 206, system 100, for example width module 152 of arranger module 150, determines how many items (from the all of the items to be displayed in the display area of the page) should be displayed in each display row (i.e. system 152 determines items placement in rows). For simplicity of explanation of stage 206 it is assumed that the order of displaying items has already been determined. In one embodiment the determination of the order of displaying items follows method 700 of FIG. 7 discussed below but in other embodiments other appropriate methods may be used for determining the order of displaying items. For example in one of these other embodiments, there may not be grouping of items as discussed in method 700.

In order to determine which items should be displayed in the first row in the described embodiment (i.e. how many items will fit), system 100, for example width module 152 of arranger module 150 starts with the available row width determined in stage 202 (which is the initial remaining row width) and subtracts one by one the cell widths of each item to be displayed in the determined display order. After each item is positioned in the row, the remaining row width is recalculated (by subtracting the cell width from the row width which remained prior to positioning that item). As long as the total cell width of all already positioned items does not exceed the available row width of that row (i.e. the remaining row width is at least as large as cell width of current item to be positioned), items continue to be placed in the first row. The first item whose cell width would cause the total width of the item cells to exceed the available row width of the first row is placed in the next (second) row (i.e. when the cell width of the current item to be positioned is larger than remaining row width of the first row, that item is placed in the next (second) row). The process is repeated for the second row and any needed consecutive rows, until all items which need to be displayed have been arranged.

In some embodiments of stage 206, not all of the items which fit in a row are necessarily put in the row. For example, in one of these embodiments a new group of items (for example as described below by method 700) may begin on a new row. As another example in one of these embodiments, a row may be constrained to include no more than a predefined maximum number of items, for example due to layout considerations.

In one embodiment it is known how many rows are required for arranging the items in the cluster after all the items have been arranged in rows.

In accordance with certain embodiments, there is provided stage 208, in which system 100, for example width module 152 of arranger module 150, can redistribute any "empty" (i.e. available) space or unintentionally empty space from the end of each row, (where the available space may in some embodiments differ from row to row). In one embodiment the width of the empty space for a given row for example being equal to the difference between the total available width of that row (as determined in stage 202) and the total width used by all the cells for items determined to be in that row (for example as determined in stage 206). These embodiments avoid a 'big' empty space at the end of each row. In one embodiment the empty space from the end of the row can be redistributed equally among all the cells of a given row as additional horizontal margin(s) (i.e. at the beginning and/or end of each cell). In another embodiment of optional stage 208 the empty space from the end of the row can be redistributed proportionately among items cells in the row, for example with cells for wider items (i.e. cells determined in stage 204 to have a larger width) receiving more excess pixels than cells for narrower items (i.e. cells determined in stage 204 to have a smaller width).

In one embodiment, the empty space is not redistributed and stage 208 is omitted. In another embodiment, empty space at the end of the row is considered intentional if the space follows the last item in a group of items, and the empty space is therefore not redistributed.

In stage 210, after each item cell has been associated with a row number and position in row, the page is prepared for display, for example by arranger module 150.

For example in some embodiments, server 110 sends the page for display by client 170, for example via network 160 and client 170 displays the page. Preparing the page for display may include for example, writing an HTML document which is sent to the web browser on client 170 along with image files for the items, where the HTML document includes inter-alia the cell width for each item in each row. The cell widths written in the HTML document may optionally include redistributed space assigned to each cell or not. If the HTML document does not include redistributed space in the cell widths, client 170 may or may not redistribute any space at the end of rows (i.e. client 170 may or may not perform stage 208). In some of these embodiments, some item related elements may be added by client 170 during the displaying of the page. For example in one of these embodiments, if the minimum cell width is known to be sufficient to display particular interactive element(s), then in some cases one or more of these interactive element(s), for example the add button, may not necessarily be included in the HTML document and may instead be added by client 170 during the displaying of the page. Optionally row and/or cell heights, for example as determined by height module 156 may be included in the HTML document or row and/or cell heights may be determined by client 170, as will be described in more detail below.

As another example, in other embodiments where arranger module 150 is in client 170, sending via a network is unnecessary and the prepared page is just displayed by client 170. In one of these other embodiments, the functionality of arranger module 150 may be integrated with the display functionality of client 170.

Figure 3:
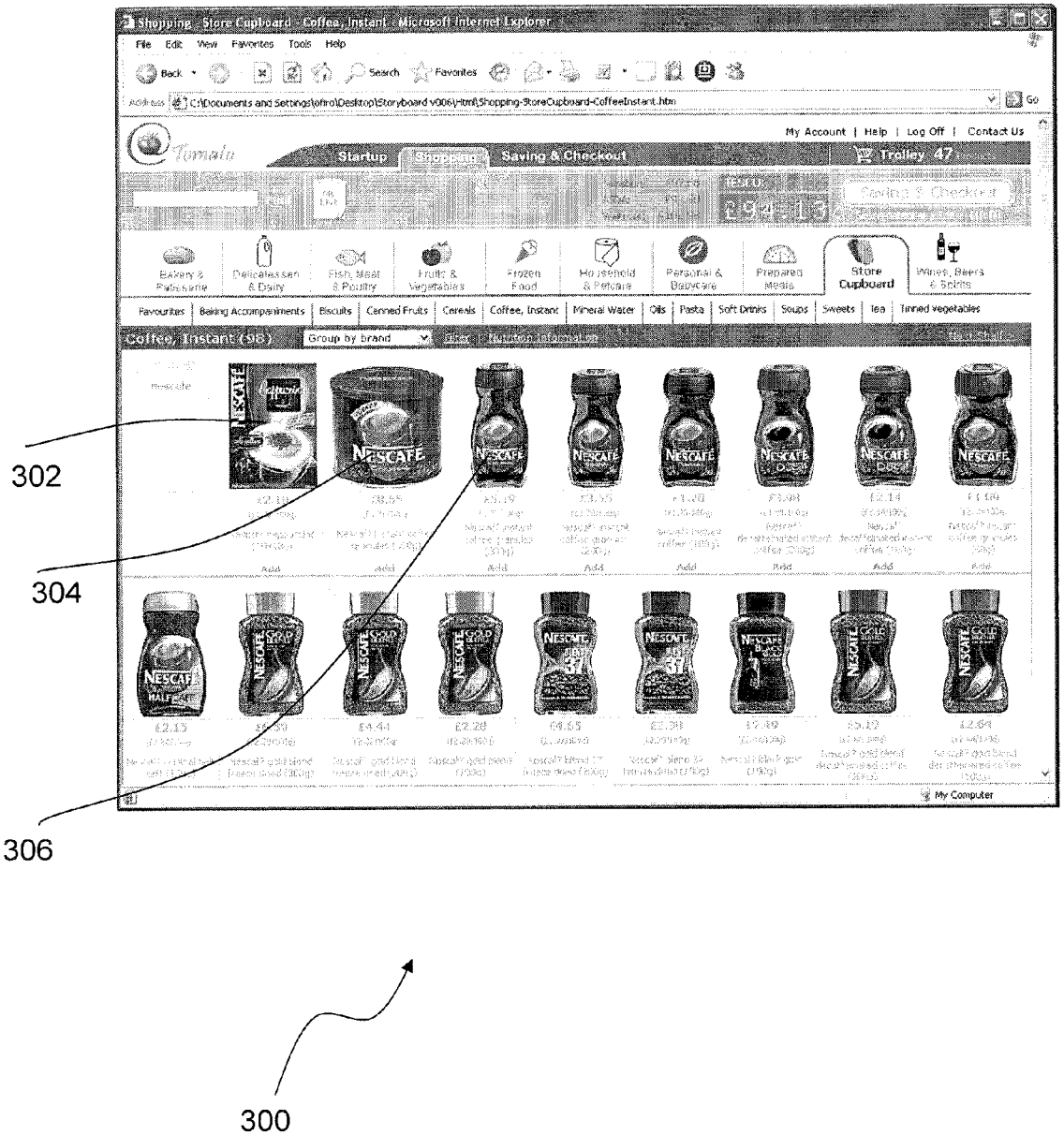
FIG. 3 is an illustration of a graphical user interface GUI with variable item cell width, according to an embodiment of the present invention.

FIG. 3 illustrates an example of a graphical user interface GUI 300 for displaying items to a user in stage 210, according to an embodiment of the present invention. The reader will easily notice that item 304 is displayed in a wider cell than item 302 which in turn is displayed in a wider cell than item 306. Therefore in the embodiment illustrated by GUI 300, there is an advantage in that more items fit into the first row than would be the case if the cell widths of all items on the page were as large as, say, the (relatively large) cell width of item 304. In addition, in the illustrated embodiment, there is an advantage of better gauging the relatively larger size of item 304 compared to item 302, and of item 302 compared to item 306 and/or of more clearly reading the packaging of item 302 and 304 than would be the case if the cell widths of all items on the page were as small, say, as the cell width of item 306. (Note that if the cell widths of all cells for items on the page were as small as the cell width of item 306, smaller images for items 302 and 304 would have needed to be displayed than the images shown in GUI 300).

In some embodiments, arranging method 200 can be coupled with possible row height variation in order to apply better utilization of the available display area by also aiming to optimize the row height. For example in some of these embodiments, system 100, for example height module 156 of arranger module 150 or an (other) application on client 170 such as the browser, can set the row height to be based on the height of the highest item image of each row or a function thereof. In one of these embodiments, when displaying the items on the screen, the row height can be set based on the highest item image in the row and/or most text in the row. For example a web browser's or another client application's natural capability to resize an HTML table's row height according to the highest item in the row may be utilized. As another example client 170 may "ask" the image how high the image is. As another example, client 170 may "ask" the text how high the text is or may determine the height of the text according to the font size. In another of these embodiments, height module 156 may set the row height based on the highest item in the row, for example during stage 206. In these cases, the result is a display in which each row in the page may or may not have a different height. In one embodiment, each row only uses the minimal amount of height required to display all the items within the row (i.e. the minimal height to display the highest item). In another embodiment vertical margin(s) can be added to a row (on top and/or underneath) to make a clearer separation between the row and the neighboring row(s) (i.e. row height is set to be larger than the height of the highest item by adding vertical margin(s)). In one embodiment, each row may be required to have at least a minimum row height, to prevent rows from being too short.

In some embodiments, arranging method 200 can be coupled with possible variation in the height of an item cell within a row (i.e. not all cells in a row necessarily have the same height) in addition to or instead of optimization of row height, thereby aiming to optimize the height of each item. The optimization of cell heights within a row can be performed for example by system 100, for example by height module 156 of arranger module 150 during stage 206. As another example optimization of cell heights within a row can be performed for example when displaying the items on the screen using a web browser's or another client application's natural capability to resize an HTML table's row height, where in the latter example each cell would be treated as an independent table. As another example, optimization of cell heights within a row can include client 170 "asking" the image or text how high the image or text is and/or determining the height of the text according to the font size. In some cases the optimization of cell heights within the row can include allowing the height of a particular cell in a row to break into another row and/or vertically splitting a row so that more than one cell occupies a vertical space in the row. For example, the breaking into another row may be suitable in some cases when the item is an advertisement image.

The height adaptability described above may be implemented for item images and/or for item related elements other than images. As an example of height adaptability for text (for example item name in text and/or item description(s) in text), in one implementation, row and/or cell height may be adjusted if necessary to fit the text (for example name in text and/or description(s) in text), for example by utilizing a web browser's or another client application's natural capability to resize HTML tables, by "asking" the text how high the text is, or by determining the height of the text according to font size. As another example of height adaptability for text (for example item name in text and/or item description(s) in text) in another implementation, row and/or cell height may be adjusted up to a certain height to fit the text, and text which cannot fit in is cropped (but may in some cases be available upon user request, for example by clicking on a link). In one embodiment, for example, the variation in row and/or cell height for an item's text may be coupled with height variation for an item's image, whereas in another embodiment, for example, the variation in row and/or cell height for an item's text may be independent of the height variation for an item's image, the latter embodiment resulting in interleaved rows for item's text and item images.

In some embodiments, the row height is set based on the height of the highest image in the row and based on the number of text lines for the item with the most text lines in the row (where the item with the highest image is not necessarily the item with the most text lines). For example, in one of these embodiments the height of a particular row may be the minimum row height or a height based on the largest image height and largest text height (most lines of text) in that row (optionally plus vertical margins), whichever is larger.

In one embodiment each item cell is made up of sub-cells in which reside separately item elements. Assume for example that the item related-elements include the image, item price, price per unit, name and the 'add' button. In this example, it is assumed that the heights of all item related elements except the item name are known by arranger module 150 in advance of stage 210 and are therefore included in the prepared page. For instance, the heights of some of the item related elements may be fixed. For the sake of this example assume that the heights of the add button or the price/per unit are fixed and therefore the heights of the corresponding sub-cells are fixed. Assume further that the heights of different images may vary from one another but that the height of any particular image may be derived from the image file. The item name height is therefore in this example the only element whose height is not known to arranger module 150 when preparing the page in stage 210. In this example, the client 170 (for example the web browser or another client application) automatically assigns to the item name the needed height since the width is a constraint which can-not be changed by client 170 during the display of the items. Assuming that in this example the height of the cell is dependent on the heights of all the sub-cells and that the sub-cell for the text is arranged vertically compared to the other sub-cells (i.e. not on the side), the number of text rows of the item name as determined by client 170 will affect the height of the cell and possibly the height of the entire row.

If row height and cell height are not determined by height module 156, then in one embodiment height module 156 may be omitted from arranger module 150.

In one embodiment, the vertical axis (length of the page) displayed to the user is not limited by the screen characteristics and a vertical scroll can be added in case the page is longer than what can be viewed in the dedicated area on the screen. (It should be noted that vertical scrolls are very well accepted in web browsers).

In one embodiment, the number of rows used to display items on the page is sufficient to place on the page all items belonging to the cluster corresponding to the page. In other embodiments, the number of rows on a page may be limited and if not all the rows for the items in a cluster fit on one page, then in one of these other embodiments, other page(s) may be created and navigation to those other pages provided, for example via link(s). For example, in one of these other embodiments, the number of rows on a page (and therefore items displayed on a page) may be limited to a number which is considered appropriate for the application and/or user. For example, in one of these embodiments, arranger module 150 determines how many items out of the cluster to fit in rows on one page and adds link(s) to any subsequent page(s) during the preparation of the page. In this example, subsequent page(s) may be displayed (for example sent to client 170 for display) upon request.

Figure 4:
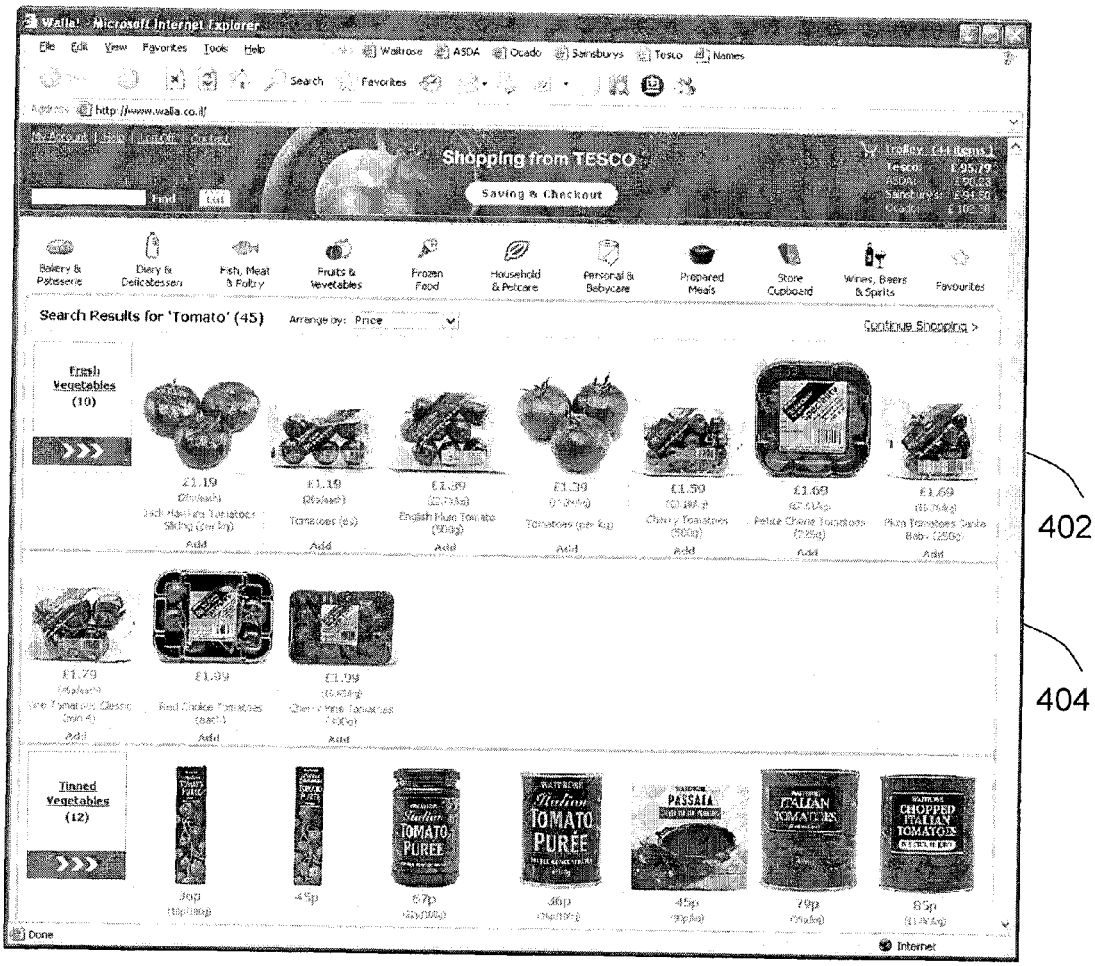
FIG. 4 is an illustration of a GUI with variable row height, according to an embodiment of the present invention.

FIG. 4 illustrates a GUI 400 with row height variation, according to an embodiment of the present invention. The reader will easily notice that row 402 is higher than row 404. By allowing row heights to vary, rather than being set based on the largest row height, more items may be fit on a page, there may be less need for a vertical scroll and/or the display area occupied by items on the page may be reduced providing more space for other use, such as for articles in fixed locations on the page. For example, assuming product items belonging to a cluster can fit on less than the entire page, advertisement items may be arranged in the remaining display area Although the described system 100 and method 200 of this invention can be used to maximize the number of items per page (display area), in practice, some layout considerations and/or other considerations, that reduce the maximum possible amount of items displayed per page, may in some cases need to be considered. Usage of system 100 and method 200 may in some cases help assure that any layout considerations are under control and that method 200 'wastes' only a minimally required amount of display area. In other words, in some embodiments optimal usage of the display, taking into account layout considerations, may require some wasting of space to provide a more efficient display for the user, even though the number of displayed items may not necessarily be maximized compared to embodiments where layout considerations are not taken into account.

One such layout consideration is 'margins' which was also discussed above. Margins are intentional empty display areas that are allocated in order for the user to better distinguish between visible elements related to different items (in other words, visible elements related to a particular item are not necessarily displayed without any space between those elements and visible elements related to other items). In one embodiment of system 100 and method 200, such margins may be controlled, and therefore are kept to a necessary minimum, which is an advantage over other systems where margins are not controlled and waste the available display area. For example, the arranger module 150 of one implementation of the system 100 may determine the maximum number of items that can be displayed per row for a given available row width. However, in another implementation, the arranger module 150 may be configured to add a 10 pixel margin to the beginning and end of each item cell width (so that there are at least 20 pixels between a visible element in one cell and a visible element in a neighboring item cell). In this other implementation, therefore, for each item that is displayed, arranger module 150 needs to subtract from the total available row width, not only the image width (assuming in this example that the cell width depends on the image width) but also an additional amount of pixels, for example 20 pixels in stage 206. This may cause the arranger module 150 to determine in this kind of implementation, that fewer items will be able to be displayed in the row. This possibly reduced number of items represents the "maximum" number of items that it is possible to display in the row under the given margin constraints and may therefore be considered efficient in this implementation. In one embodiment of the invention, a fixed amount of margin is added to each item by system 100. In another embodiment, system 100 adds a variable amount of margin to each item according to criteria controlled by system 100.

In an embodiment where the amount of margins added to each cell is controlled by system 100, there is an advantage compared to the related art methods where the amounts of margins in each cell are a result of all cells having fixed width, thereby causing narrower images to have too large margins.

It should be noted that margins are not necessary in all embodiments of the invention. For example, in some embodiments visible grid lines may serve the function of visually separating items alternatively or additionally to margins. In one of these embodiments visible grid lines divide between one or more elements of an item from neighboring items but there are no visible grid lines between other elements of the item and neighboring items.

Another layout consideration is the desirability of displaying items in rows. Item images (and/or other item related element(s)) are usually displayed in rows, meaning that bottoms, centers, tops or some other such points of the images (and/or other item related element(s)) in a row are aligned on the same vertical position (i.e. one could draw an imaginary horizontal line and connect the aligned points in the row). This alignment ensures that visual rows are created, making it easier for the user to visually review the page, in much the same way that written text in a word processing document is arranged in rows. In one embodiment of system 100 and method 200, each row is set to display the maximum number of items that can be placed in it, minus in some cases necessary layout margins discussed above. Therefore in this embodiment each row contains a maximum number of items in relation to the row width, and as such, each row may contain a different amount of items, depending on the items' individual widths. In other embodiments, each row may include less than the maximum number of items due to certain layout, business or other considerations. For example in one of these other embodiments, each row may be constrained to include no more than a predefined maximum number of items, for example due to layout consideration. As another example, in one of these other embodiments, each new group of items begins on a new row.

The reader will understand that the allowed variability in number of items per row in some embodiments of the invention is advantageous over display method A, described above where there is only one item and item image per row and over display method B, where there can be several items per row, but all rows have the same number of cells with fixed widths.

It is noted that method 200 described above allows both different cell widths within a row and different numbers of items for different rows. However, in another embodiment of the invention, system 100 may add the constraint, for example due to layout considerations, that each item in a given row has a fixed cell width (meaning all cells in a certain row have the same width) which may in some cases be different than the fixed cell width of another row. Therefore in this other embodiment, each row may in some cases have a different number of items displayed. In order to implement this other embodiment, system 100 may execute a variation of method 200 illustrated by method 500 of FIG. 5 (and therefore, unless otherwise specified, the description of method 200 above also applies to method 500).

Figure 5:
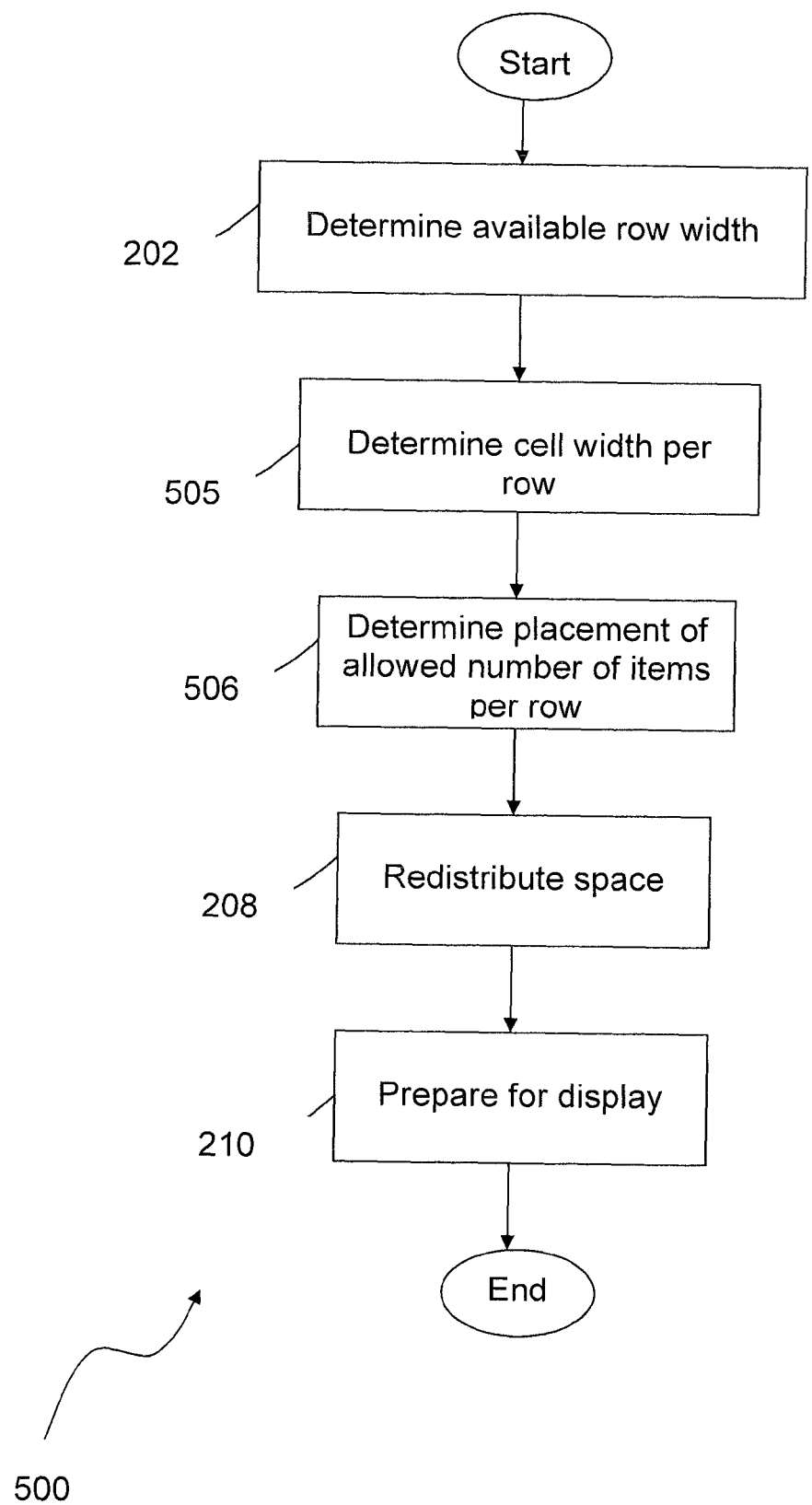
FIG. 5 is a flowchart of a method for arranging items in rows, according to an embodiment of the present invention.

FIG. 5 illustrates method 500 of arranging items in rows on a page, where there is a fixed cell width in a given row according to this other embodiment of the present invention. The invention is not bound by the specific stages or order of the stages illustrated and discussed with reference to FIG. 5. For example, stage 202 and 505 can be performed in any order or simultaneously. It is again assumed for simplicity of explanation that the items to be displayed on the page and the order of display are known.

Method 500 includes stages 202, 208 and 210 which were discussed above and will therefore not be elaborated on here. (Note that due to the fixed cell width in a given row, stage 208 may in some cases be unnecessary because the available row width may be a-priori distributed among the fixed cell widths). In stage 505, a fixed cell width is determined for items in each row. For example, in one embodiment, system 100, for example arranger module 150 may set the cell width in a given row to the width of the first item to be displayed in that row (where the width of the first item can be determined for example in a similar manner as described above for stage 204). As another example in another embodiment the cell width can be set to the average item width for that row (where the width for each item in the row can be determined for example in a similar manner as described above for stage 204, and then the average may be determined by dividing the total widths of all items in the row by the total number of items in the row). As another example, in another embodiment the cell width can be set so as to accommodate the largest cell width desired for any item in the row (i.e. the cell width desired for each item in the row can be determined for example in a similar manner as described above for stage 204 and then the largest of the desired cell widths can be chosen as the actual cell width for each item in the row). In one embodiment where the cell width is set to the largest cell width or the average cell width, stage 505 may include trial and error (i.e. one or more iterations) until the fixed cell width for a given row is finally determined.

The timing of stage 505 is not limited by the invention. For example in one embodiment, the cell width per row is set for all rows prior to arranging items in rows whereas in another embodiment the cell width is set for a given row prior to arranging items in that row.

In stage 506 the placement of the allowed number of items in each row is determined, where the allowed number of items in a particular row equals the particular row width determined in stage 202 divided by the fixed cell width per item for that particular row (determined in stage 505). For example in one embodiment, more than one image is stored for each item and the image whose width best matches the fixed cell width per item for that particular row is selected, and any necessary resizing (resealing) is performed on the selected image to fit the fixed cell width per item of that row. For example, in another embodiment, only one image is stored for each item, and any necessary resizing (resealing) is performed on that image. For example in another embodiment, one or more item related elements may be omitted or included depending on the size of the fixed cell width.

In another embodiment of the invention, system 100 may add the constraint that each row includes the same number of items but the width of each cell in a given row may vary. In this embodiment, each row has the same number of items displayed but each cell's width is optimized according to the width of the item within the cell. Therefore instead of having a fixed cell size for each item regardless of the item's width as in some prior art implementations, in the embodiment illustrated in FIG. 6 wider items are placed in a proportionally wider cells and narrower items in proportionally narrower cells. In order to implement this embodiment, system 100 may execute a variation of method 200 which is illustrated by method 600 of FIG. 6 (and therefore unless otherwise specified the description of method 200 above also applies to method 600).

Figure 6:
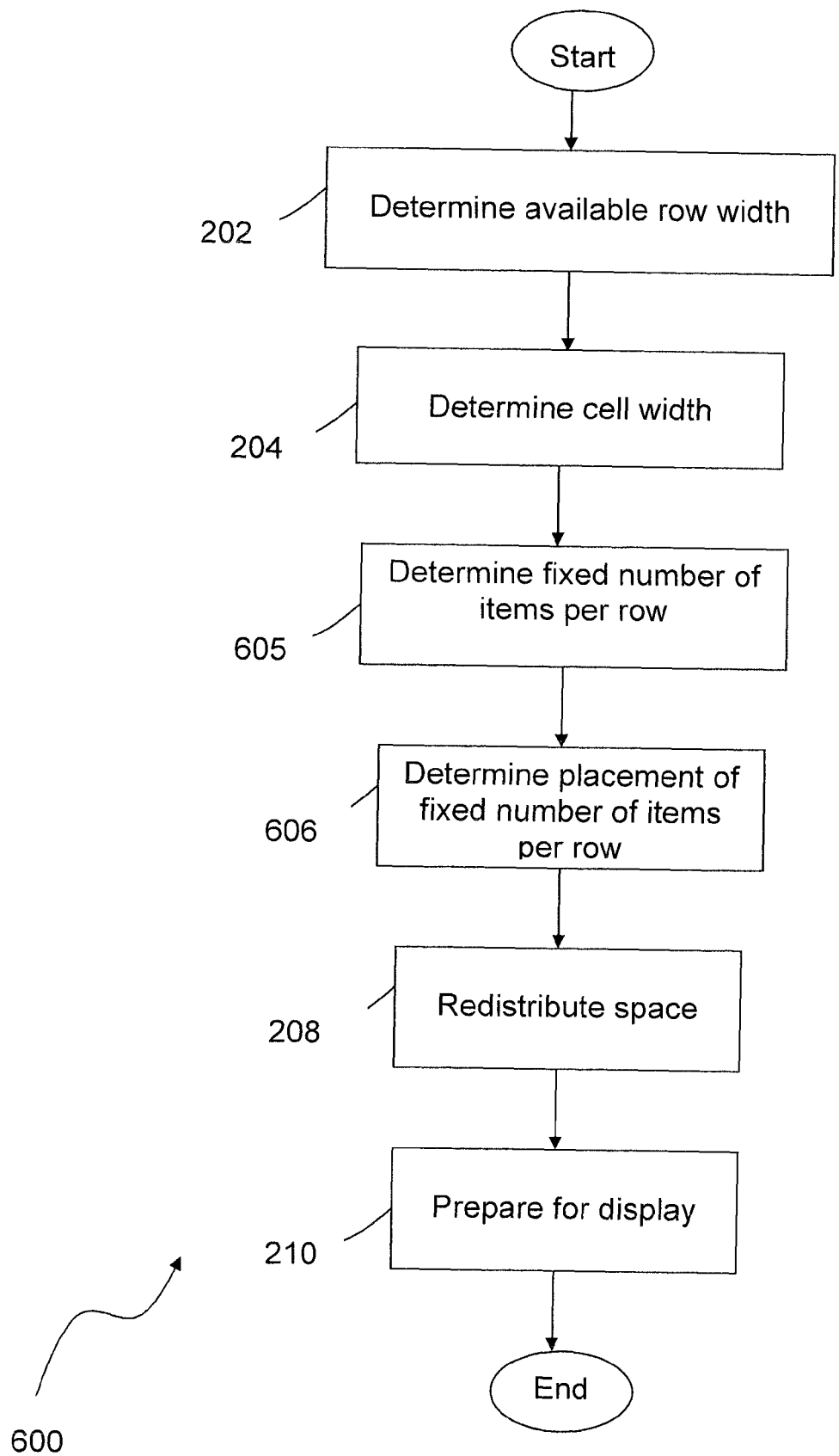
FIG. 6 is a flowchart of a method for arranging items in rows, according to an embodiment of the present invention.

FIG. 6 illustrates method 600 of arranging items in rows on a page, where there are a fixed number of items per row according to this other embodiment of the present invention. The invention is not bound by the specific stages or order of the stages illustrated and discussed with reference to FIG. 6. For example stages 202, 204 and 605 may be performed in any order or simultaneously. It is again assumed for simplicity of explanation that the items to be displayed and the order of display are known.

Method 600 includes stages 202, 204, 208 and 210 which were discussed above and will therefore not be elaborated on here. In stage 605, the fixed number of items per row is determined. For example in one embodiment the fixed number may be system defined. In another embodiment the fixed number may be specified by the user (for example one user may prefer less items per row than another), although in some cases an allowable range within which the fixed number must lie may be predefined. In another embodiment the fixed number may be specified by the user but if not specified a system default may be applied.

In stage 606, the placement of the fixed number of items in each row is determined, with cell widths for items varying in accordance with the determined cell width for each item (see above description of stage 204). In one implementation of this embodiment the width of any item image may be constrained to be less than a predefined maximum (i.e. may be resized if necessary in order to be less than a predefined maximum) so that it is less likely that the total width required to fit the cells for the fixed number of items will exceed the available row width.

In the above description of methods 200, 500, and 600 it was assumed that the items to be displayed on a page are known as well as the order of display. Now embodiments will be described with reference to FIG. 7, for determining which cluster of items is to be displayed on a page and/or the display order of items on a page. As mentioned above, the items to be displayed on the page and the order of display for method 200, 500, and 600 are not bound by the embodiments described now with reference to FIG. 7.

Figure 7:
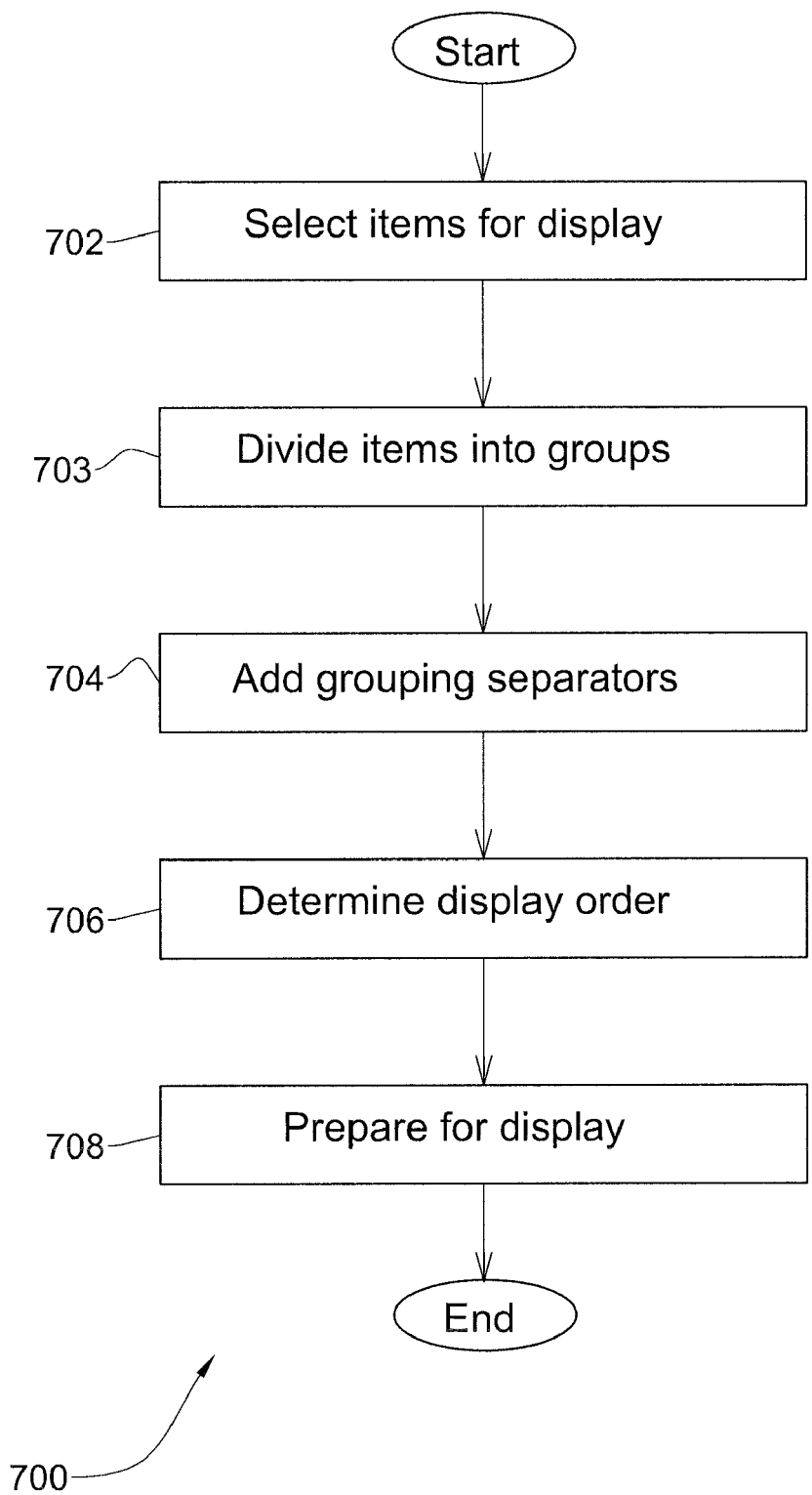
FIG. 7 is a flowchart of a method for grouping items, according to an embodiment of the present invention.

FIG. 7 illustrates a method 700 for grouping items, according to an embodiment of the present invention. The invention is not bound by the specific stages or order of the stages illustrated and discussed with reference to FIG. 7.

In stage 702, all the items to be displayed in the page display area are determined by system 100, for example by clustering module 130 as described above. For simplicity of description it is assumed in the description of method 700 that the cluster of items determined by clustering module 130 fits on one page, however if the cluster of items is displayed on more than one page, method 700 may be applied to include the grouping of the items on more than one page, mutatis mutandis.

In one embodiment, the determination of which (cluster of) items are to be displayed on a page is random. In another embodiment the determination of which (cluster of) items are to be displayed on a page is at least partly based on the storage order in database 120. In other embodiments, items are at least partly grouped based on one or more criteria, for example based on a user characteristic(s), system characteristic(s), application characteristic(s) and/or item characteristic(s). For example, in an embodiment where vertical scroll is not desired, the dimensions of the screen may affect the number of items displayed on a single page. As another example, if the page to be displayed is the shopping cart page in the application, product-items which are not necessarily on the same shelf (i.e. would not necessarily be on the same shelf in the store) may in one embodiment be part of the same cluster displayed on the same page. As another example, if the user searches for product-items with particular attribute(s) (for example on sale, organic, etc.), items which are not necessarily on the same shelf may in one embodiment be part of the same cluster displayed on the same page. Continuing with the example, in one embodiment items on the same shelf which do not meet specified search attributes may not be part of the cluster displayed on a page of items corresponding to the product family. As another example, if a first user lives in an area where certain items are not available and a second user lives in an area where the items are available, then in one embodiment the page displayed to the first user may exclude those items from the cluster and the page displayed to the second user may include those items in the cluster. As another example, if the user is shopping (browsing), in one embodiment items on the same shelf may be part of the same cluster displayed on the same page (i.e. in this example the cluster of items on a page corresponds to the items which would be on the same shelf in a store).

Items may belong to one or more clusters, depending on the embodiment. For example in one embodiment, each item has stored attribute(s) or assignment(s) which allow the item to be placed on the appropriate page(s). As another example, in one embodiment each item has stored attribute(s) or assignment(s) which allow an item to be placed in the cluster(s) to which the item belongs so that the item can be displayed with the corresponding cluster(s). In some embodiments, stored attribute(s) allow an item to be dynamically included in the appropriate cluster(s) and/or page(s) based on a rule/query associated with the cluster(s) and/or page(s). For example, the rule/query may be predefined or may be adjustable. Continuing with the example, in one embodiment the rule/query may be tailored to a user, for example provided by a user via user interface 172 and/or determined implicitly, for instance based on past user requests and/or user characteristic(s). As another example, in one embodiment, database 120 may include a planogram cross-referencing items with clusters, items with groups and/or groups with clusters. As another example, each item may have stored attribute(s) or assignment(s) which allows an item to be placed in a group, and also stored in database 120 is a planogram which lists which groups correspond to a particular cluster. Continuing with this example items may be assigned to, or may have attribute(s) which allow the items to be placed in product families, and a planogram may list which product families belong on a particular shelf. In embodiments where the placement of an item on a particular page and/or in a particular cluster depends on item attribute(s), one or more attributes of the item may influence whether an item belongs on the particular page and/or particular cluster.

To make more efficient use of pages when a cluster of items are displayed within each page, as suggested by the invention, items within the page are arranged to be displayed in groups.

In stage 703, the items to be displayed on the page are divided into the groups with which the items will be displayed, for example by group divider module 154.

In one embodiment, grouping the items that are displayed on a page occurs when a large number of items are displayed on a page whereas in another embodiment, grouping may even be performed if the number of items is not large.

In one embodiment, the grouping of items is random. In another embodiment the grouping of items is at least partly based on the storage order in database 120. In another embodiment, items are grouped at least partly based on one or more criteria, for example based on a user characteristic(s), system characteristic(s), application characteristic(s) and/or item characteristic(s).

In one embodiment, database 120 includes assignment of each item into group(s). In another embodiment items in database 120 additionally or alternatively have attributes that allow items to be associated into groups dynamically (as defined by a query or other known method) by group divider module 154. Depending on the embodiment, the page is set by default or by the user to display the cluster of items (for example the database list of products) according to a specific grouping arrangement. For example, in one embodiment, an item may be included with an assigned group as a default, but based on a user's preference another grouping arrangement may allow the item based on the item's stored attributes to be grouped with possibly other items. In this embodiment, the user's preference may be provided explicitly by the user for example via user interface 172 or may be determined implicitly, for example based on past user grouping request(s) or known user characteristic(s)

In embodiments where the placement of an item in a particular group depends on item attribute(s), one or more attributes of the item may influence whether an item belongs in that particular group.

In one embodiment, for example, if a user selects the ice-cream aisle, all items predefined as ice-cream are selected for display on the page. If the aisle is set by user or preset by system to group by flavor, then in one implementation the ice-cream items might be arranged in groups as follows: all the chocolate ice-cream might be grouped in one group, all the vanilla ice-cream in the next group, all the fruit flavored ice-cream in yet another group, and all the other ice-cream remaining in an 'Others' group. Continuing with the ice cream example, in another implementation items in an 'ice cream' page may be allowed to be grouped by brand and/or by flavor.

Grouping items can in some cases help the user to orient himself and target his visual search without needing to dedicate focus to a single item. For example, if a user were looking for a Ben & Jerry's™ ice cream pack on a page that displays, say one hundred different ice cream items, the user could request that the items on the page be grouped by 'brand'. Once all the Ben & Jerry's™ ice cream packs are displayed grouped together, it is easier for the user to find all of Ben & Jerry'S™ ice cream packs and then decide on a specific one that the user wants. Alternatively, if the user were looking for a chocolate flavored ice cream, the user could request that the items on the page be grouped by 'flavor'. Once all the chocolate flavored items are grouped together, it is easier for the user to review the entire set of items that belong to this 'chocolate flavor' group and pick the right one.

Another possible effect of grouping is creating areas that share a visual common denominator. For example, if the items on the page in the above example were grouped by brand, then all the Ben & Jerry's™ items that have a common style create a visual area of one type (have similar pack shape, logos, color schemes, and/or other visual attributes), and all the Haagen Dazs™ packs create another visual area with a common theme. When the user scrolls this page it is thus easy for the user to find and focus on a desired group, and ignore an undesired group, even without necessarily inspecting each one of the group members separately.

Grouping also allows system 100 to optionally display items that would otherwise be displayed on separate pages, on a single page, while maintaining order and readability in the page. For example, instead of putting butter-items and margarine items on separate pages, butter-items and margarine-items can be put on the same page and be visually separated.

Grouping also allows system 100 to optionally visually display one or more sorting levels on a single page. For example on a page displaying fruit, items may be grouped by fruit families and items may be ordered (i.e. arranged) within the fruit families by price.

Grouping also allows system 100 to optionally provide varying degrees of specificity, i.e. the groups may be more general or more specific. For example, in one embodiment if the grouping is based on a single item attribute, each group will probably include more items compared to a grouping which is based on multiple item attributes, where each group will probably include fewer items which are more closely related. Continuing with the example, wines may in one implementation be grouped by country of origin or grape type, and in other implementation wines may be grouped by country of origin and grape type.

In optional stage 704, one or more group separators are added by system 100, for example by group divider module 154 and/or width module 152 of arranger module 150. In one embodiment, group separators are retrieved from database 120. In another embodiment at least some group separators or at least some elements of the group separators are created in real time.

Depending on the embodiment, a group separator can be graphic, textual and/or any other element/technique used to establish a visual separation (i.e. visible gap) between two neighboring groups of items (i.e. between the last item in one group and a first item in the following group). The group separator is therefore a visible gap which depending on the embodiment may include "empty space" and/or may be at least partly "filled", for example with a graphic and/or textual element(s). It should be understood that the visible gap between neighboring groups on a page used in a particular application should be distinguishable over any element/technique used to separate between neighboring items in a same group in that particular application. It should also be understood that neighboring groups are not necessarily adjacent but there is no other group in between the neighboring groups. Similarly neighboring items in the same group are not necessarily adjacent, but there is no other item in the same group in between neighboring items in the same group.

In one embodiment, the group separator includes a graphic and/or textual element(s) which defines the content of the group (i.e. describes the group) that follows that group separator. For example, one group separator could be a graphic element such as a red triangle, used between one group and the other. Another type of separator could be a text label, for example 'Chocolate', 'Vanilla', 'Fruit', etc. Yet a third type of group separator could be a graphic element such as a red triangle with textual labels within the graphic element. Still another type of separator could include space (in addition to or instead of one or more graphic and/or textual elements), and/or breaking to a new line so as to begin the new group at the beginning of the next row (in addition to or instead of one or more graphic and/or textual elements).

In some embodiments, method 200, 500 or 600 included the placement of group separator(s), (or the placement of one or more elements of the groups separator(s)). For example in some of these embodiments, one or more group separator cells can have a predefined fixed width, whereas in another embodiment one or more group separator cells can have a dynamic width according to the amount of space the separator occupies. For example, in one of these embodiments a predefined fixed cell width may include the fixed width of a graphic and/or textual element. As another example, in one of these embodiments the predefined fixed cell width may include additionally or alternatively the predetermined width of a certain amount of empty space. As another example, in one of these embodiments cell width may be semi-fixed, for example including a dynamic width for a graphic and/or textual element and a fixed width for a certain amount of empty space before the graphic and/or textual element.

In some embodiments, not all groups have group separators. For example, in some of these embodiments the first group has no group separator, whereas all other groups have group separators. Continuing with the example, in one of these embodiments, there is no group separator before the first group on a page but the group separator before each group after the first group includes a visible gap comprising a graphic element, textual element, space and/or breaking into a new line.

In some embodiments, there may be a group separator after one or more groups on the page. For example, in one embodiment there is a group separator after the last group on the page indicating the logical next cluster of items (and/or next page) to view and optionally a link to the next page.

In stage 706, the display order of items is determined by system 100, for example by group divider module 154 of arranger module 150. In one embodiment, the order in which items are arranged for display is random. In another embodiment the order in which items are arranged for display is at least partly based on the storage order in database 120. In other embodiments, the order is at least partly based on one or more criteria (for example system characteristic(s), application characteristic(s), user characteristic(s) and/or item characteristic(s)). For example in one of these embodiments, one or more criteria can be system-predefined (for example the system definition may be to always show groups and/or items within groups from cheapest to more expensive). In another of these embodiments one or more criteria are received from user input (for example the user can decide how to sort the groups and/or items within the groups). In another of these embodiments, one or more criteria are based both on system predefinitions and user input. For example the user can select to sort the groups and/or items within groups in alphabetical order but if more than one group and/or item have the same name, the system predefinition may be to sort the groups or items with the same name from cheapest to most expensive. As another example one or more criteria may be based on user inputs but if no inputs from the user are received, then the defaults are according to system predefinitions. As an example of multiple criteria which can be used in one embodiment, the various groups of items can be presented on the page in alphabetical order whereas within each group the items can be presented on the page in the order of increasing price.

In one implementation of stage 706, group divider module 154 first sets the order of groups for display on a page based on any appropriate one or more criteria (for example based on system characteristic(s), user characteristic(s), application characteristic(s) and/or item characteristic(s)). The order of the groups can in one embodiment be set automatically by group divider 154, for example, by alphabetical order of group names or by number of items in each group. As another example, the order may be based on the attributes of the items in the group. Continuing with the example in one embodiment the group with the most popular brand items (leading brands) may be displayed first whereas in another embodiment the croup with cheapest items may be displayed first. The order of the groups can in addition or instead be predefined in an arbitrary way. The user of system 100 may in one embodiment be given the option to select from a number of predefined orders for the groups, according to his preference and need. The manner of ordering groups on a page may be determined once for all the pages in system 100 in one embodiment, for each individual page separately in another embodiment, or at once for all pages but with the ability to override the determined manner at any page in another embodiment.

After the order of the groups have been set, in this implementation items within each group are ordered (sorted) by group divider module 154. In one embodiment the items in a group are ordered according to a predefined sorting order. In another embodiment ordering (sorting) can be according to a sorting order set by the user. Additionally or alternatively, sorting order may be based on any appropriate one or more criteria (for example based on system characteristic(s), user characteristic(s), application characteristic(s) and/or item characteristic(s)). For example, items within each group can be set to be ordered by price or price per unit. Continuing with the example, if group sorting order is set to display 'by price', then in one embodiment the first item in the group might be the cheapest, followed by the next item which is the second cheapest item, and so forth up to last item in the group which may be the most expensive item.

Sorting order within a group, in one example, may be set once for the page and be applied to all the groups in the page. As another example, sorting order within a group may be assigned to each group individually and independently of the other groups on the page. As another example sorting order within a group may be set once for all the pages in system 100, optionally with the ability to override the setting at any page.

Depending on the embodiment items within all groups may be ordered at the same time or the items within each group may be ordered at different times, for example the items within the first group to be displayed may be ordered before the items in the second group to be displayed are ordered. Depending on the embodiment, the grouping of items, the ordering of groups and/or the ordering of items within groups on a particular page displayed to a user may or may not be allowed to be changed from the original order that the page was displayed to the user.

The manner of grouping items, the manner of ordering of groups and/or the manner of ordering of items within groups may or may not be related to one another. For example in one embodiment, group divider module 154 may divide grocery items on a page into groups based on any of the following inter-alia: featured items/non-featured items, on sale/not on sale, brand, diaper size, country of origin (wines), type, flavor, and/or coffee strength, etc., whereas group divider module 154 may order the items within each group based on any of the following inter-alia; alphabetic order of item name, price of item, price per unit for item and/or number of calories, etc.

It should be noted that the clustering of items, the grouping of items in the cluster, the ordering of the groups, and/or the ordering of items within groups are not limited by the invention to the examples described herein.

From the above discussion, it will be apparent to the reader that depending on the embodiment the display of an item to a user may be affected by any of the following levels of grouping inter-alia: on which page(s) clustering module 130 includes the item, how group divider module 154 groups items on a page including the item, in which order group divider module 154 arranges the different groups on a page, and/or in which order group divider module 154 orders items within a group. The likelihood of influencing whether an item is ignored or focused upon may in some cases be enhanced when grouping includes multiple levels rather than a single level.

In some embodiments, items are stored in database 120 already (at least partly) grouped according to a predefined order, or the order of display (at least partly) follows the order of the items in database 120. In some of these embodiments stage 703 and/or part or all of stage 706 may include extracting the items from the database in the order stored in database 120. For example, in one of these embodiments, group divider module 154 divides items into groups and determines the order of the groups, for example according to user, system, application and/or item characteristic(s), but the order of items within each group follows the order of the items in database 120. As another example, in one of these embodiments, the order of groups may be based on the order of items in database 120 (for example the group which has the item earliest in the database order is set to be first).

In some embodiments, stages 704 and/or 706 are performed in an interleaved fashion. For example, in one implementation of stages 704 and 706, at the beginning of the first row of the display area of the page, system 100 allocates a certain amount of width for the first group separator item (for example according to a not necessarily constant separator size, or for example according to a predefined uniform separator size). Within the allocated amount of width, system 100 places the first separator (for example a graphic element and/or a text label associated with a specific group, and/or an amount of space). Following the separator, system 100 places all the items that belong to that specific (first) group, for example according to the order of the items in the database or for example according to user or system defined sorting order. Following the last item in the first group or on a new line system 100 then allocates width for a second separator (for example a graphic element and/or a text label associated with a specific group, an amount of space and/or breaking to a new line), in the same manner it was allocated for the first group separator. System 100 then lays out the items of the second group, and so on, to the third group, fourth group, etc. In one embodiment, upon user request or for any other reason the current order on the page (for example grouping arrangement, order of items within a group and/or order of groups) can be changed to a different order. The system will then reposition the items and separators on the page accordingly. The allocation of width for the group separator items and other items and/or the arrangement of the items in rows, may in one embodiment be performed as described above in method 200, 500 or 600.

In stage 708 after the order of items on the page has been determined, the page is prepared for display, for example by clustering module 130 and arranger module 150. For example in one embodiment, server 110 sends the page (including the arranged items in order and optionally separators) for display by client 170, for example via network 160 and client 170 displays the page. Preparing the page for display may include for example, writing an HTML document which is sent to the web browser on client 170 along with image files for the items, where the HTML document includes inter-alia the arrangement of each item in the page. In some embodiments, some item related elements may be added by client 170 during the displaying of the page. For example in one of these embodiments, if the minimum cell width is known to be sufficient to display particular interactive element(s), then in some cases one or more of these interactive element(s), for example the add button, may not necessarily be included in the HTML document and may instead be added by client 170 during the displaying of the page. As another example, in other embodiments where clustering module 130 and arranger module 150 are in client 170, sending via a network is not required and the prepared page is just displayed by client 170. In one of these other embodiments, the functionality of arranger module 150 and/or clustering module 130 may be integrated with the display functionality of client 170.

Figure 8:
FIG. 8 is an illustration of a GUI with separators, according to an embodiment of the present invention.

FIG. 8 illustrates a GUI 800 which includes separators 802 in order to show more than one fruit family on a page. Note that in the illustrated GUI 800 separators 802 are not limited to predefined positions, for example at the beginning or end of a row. In another embodiment, separators 802 used in a browsing (shopping) page are limited to predefined positions.

Figure 9:
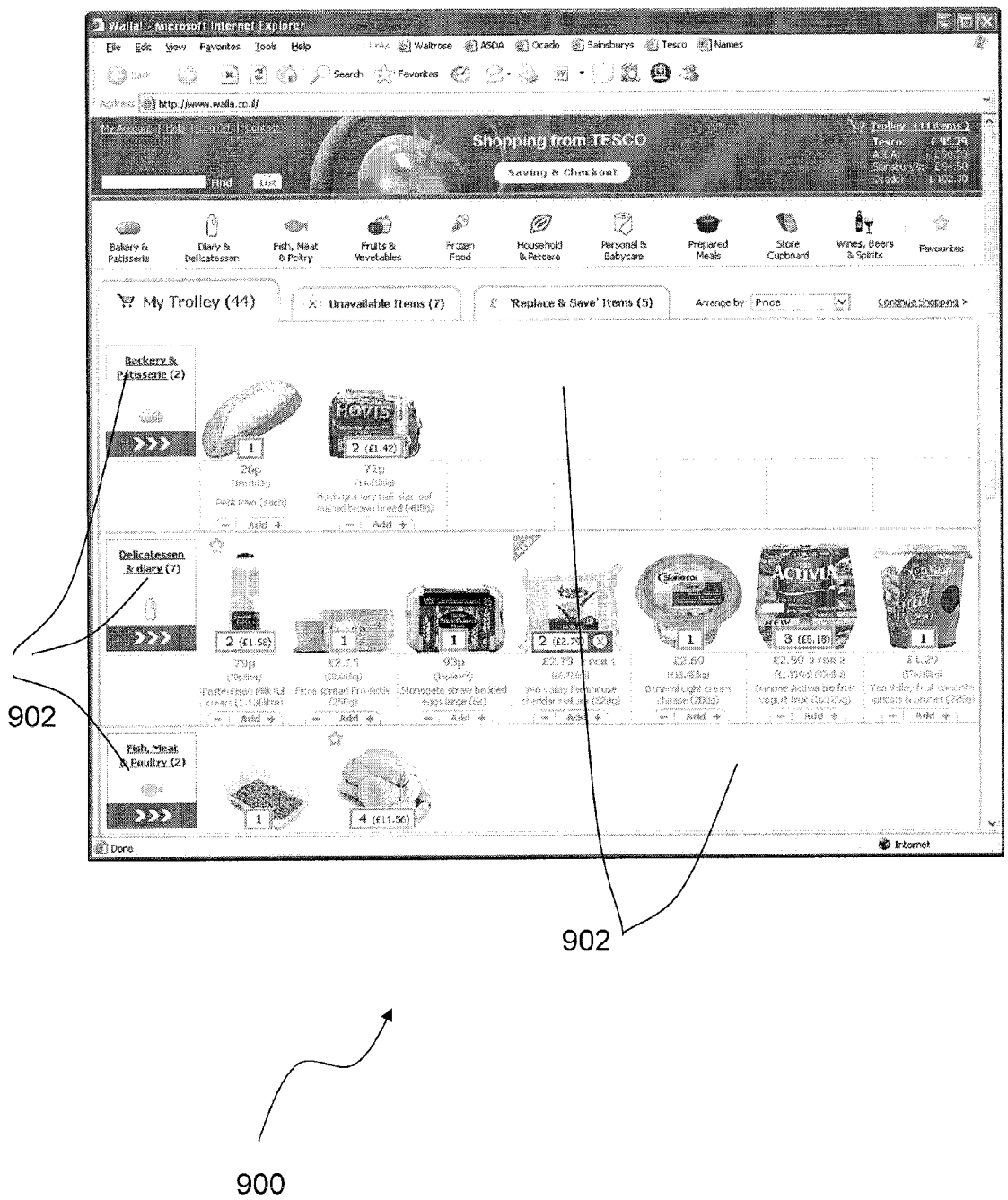
FIG. 9 is an illustration of another GUI with separators, according to an embodiment of the present invention.

FIG. 9 illustrates a GUI 900 which shows a trolley/shopping cart with separators 902. Note that separators 902 include both graphic/textual separators and space/break line separators. In another embodiment, separators 902 used in a shopping cart page are not limited to predefined positions.

It should therefore be evident to the reader that an advantage of the invention is that the invention can be used to efficiently display items for many different applications and for many different stages of an application. For example, GUI 800 would be displayed to the user when browsing for items to buy whereas GUI 900 would be displayed to a user during checkout or verification of trolley/shopping cart contents.

In one embodiment, the clustering of items, the grouping of items in a cluster, the ordering of the groups, the ordering of items within groups, the usage of separators in predefined or not necessarily predefined positions, and the type of group separators are the same for different stages of an application (for example, in a shopping application, the stages of shopping (browsing), checkout, verification of shopping cart, listing of favorites, listing/search of items with certain attribute(s), etc). In another embodiment one or more of the following: the clustering of items, the grouping of items in a cluster, the ordering of the groups, the ordering of items within groups, the usage of separators in predefined or not necessarily predefined positions or the type of group separators may vary for different stages of an application.

In some embodiments, method 700 and method 200 (or 500 or 600) are both performed, for example in parallel. For example in one of these embodiments stages 702, 703 and 202 (and/or 605) may be performed first, followed by stage 204 (or 505). Stages 206 (or 506 or 606), 704 and 706 are performed in an interleaved fashion, followed optionally by stage 208. Stage 708 combined with stage 210 is performed last. In another embodiment, only one of methods 200 (or 500 or 600) and 700 are performed. In some other embodiments, not all stages of methods 200 (or 500 or 600) and 700 are necessarily performed. For example in one of these embodiments, stage 704 is omitted when method 700 is performed along with method 200 (or 500 or 600).

Figure 10A:
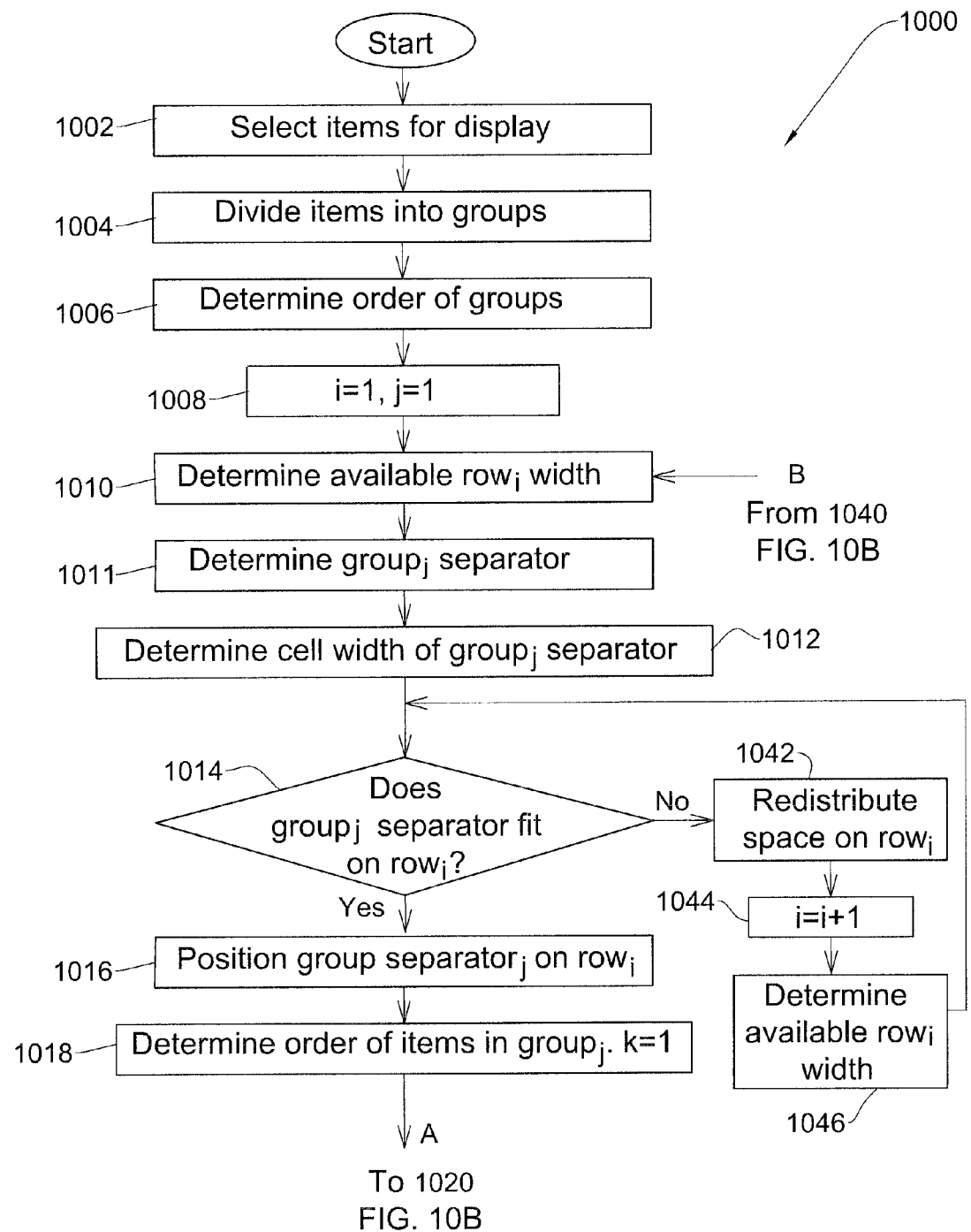
FIG. 10 (comprising FIGS. 10A and 10B) is a flowchart for grouping and arranging items in rows, according to an embodiment of the present invention.
Figure 10B:
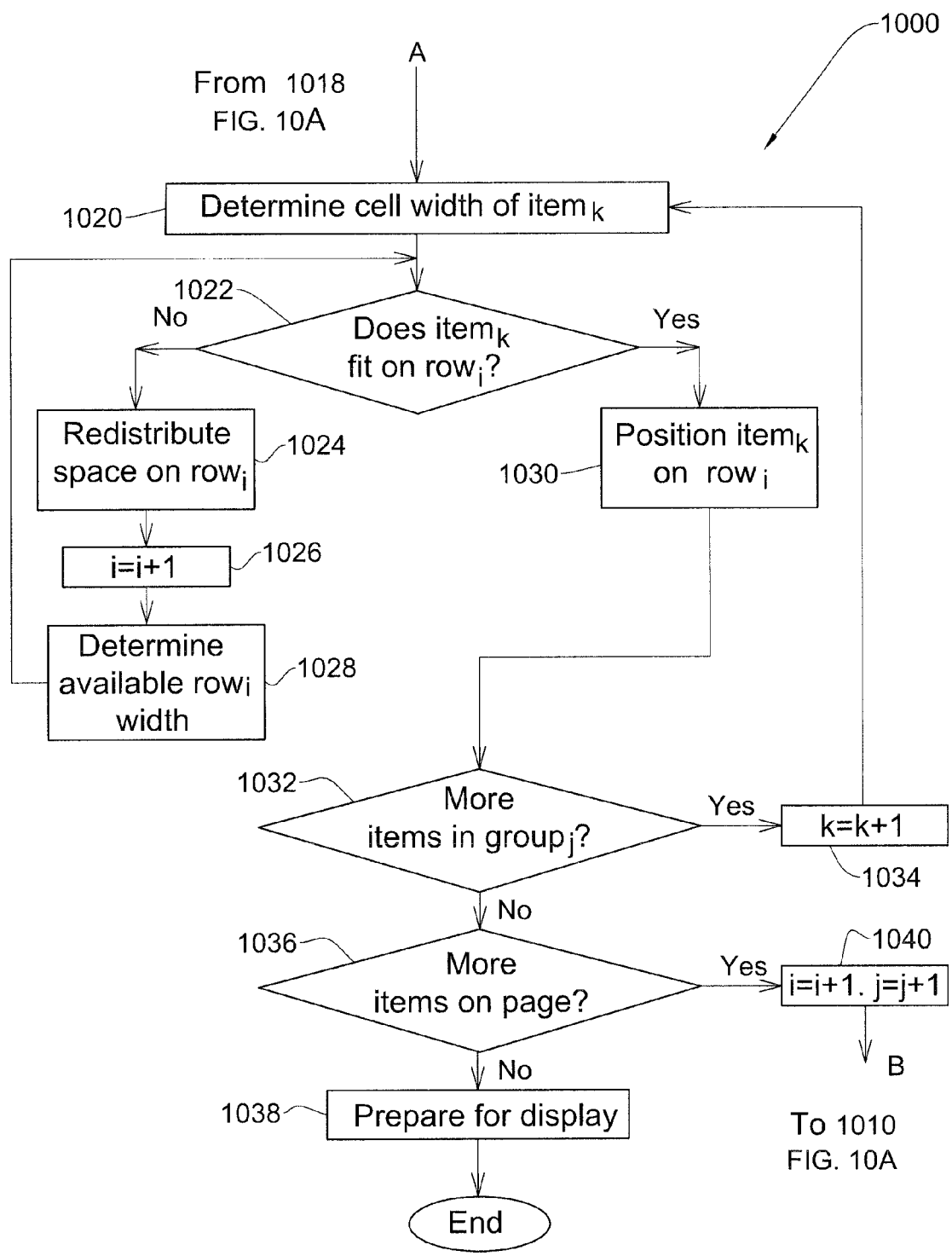

FIG. 10 is a flowchart of a method 1000 for arranging items in rows on a page which includes cell width adaptation (for example in accordance with method 200, 500 or 600) and grouping of items (for example in accordance with method 700). The invention is not bound by the specific stages or order of the stages illustrated and discussed with reference to FIG. 10.

In stage 1002, the cluster of items for display on the page (display area) are selected, for example as described with reference to stage 702 above. In stage 1004, the items to be displayed on the page are divided into groups, for example as described above with reference to stage 703. In stage 1006, the order of display of the groups is determined, for example as described above with reference to stage 706. For each row in turn the available row width is determined in stage 1010, for example as described above with reference to stage 202. For the first group (j=1) and the first row (i=1), a group separator for the group is optionally determined in stage 1011, for example as described above with reference to stage 704. Assuming that a group separator is used for the group, then in optional stage 1012 the cell width of a group separator item is determined, for example as described above with reference to stage 204 or 505. In another embodiment, the group separator cell width may be fixed or semi-fixed. Assuming the group separator item, if being used, fits on the row (yes in stage 1014), method 1000 proceeds with stage 1016. The determination in stage 1014 of whether the group separator item fits may be for example as described above with reference to stage 206, 506 or 605 (where if the determination is as described for stage 605, there is a fixed number of items which will necessarily fit on a row). In stage 1016, the group separator item, if being used, is positioned on the row for example as described above with reference to stage 206, 506 or 606. In stage 1018, the order of items in the group is determined, for example as described above with reference to stage 706. (For the sake of simplicity of description herein the group separator item is not considered part of the group of items counted by k). Starting with the first item (k=1) in the group, the cell width of the item is determined in stage 1020 for example as described above with reference to stage 204 of 505. If the item fits on the row (yes to stage 1022) then method 1000 continues to stage 1030. The determination in stage 1022 of whether the item fits may be for example as described above with reference to stage 206, 506 or 605 (where if the determination is as described for stage 605, there is a fixed number of items which will necessarily fit on a row). In stage 1030, the item is positioned on the row, for example as described above with reference to stage 205, 506, or 606. Assuming there are more items in the group (yes to stage 1032) then method 1000 continues to the next item (k=k+1 in stage 1034), iterating back to stage 1020. If one of the items in the group do not fit on the row (no to stage 1022), then method 1000 optionally continues with stage 1024 redistributing any leftover space for example as described above with reference to stage 208. The next row is then processed (i=i+1) in stage 1026, with the available row width for the next row determined in stage 1028 for example as described above with reference to stage 202. Method 1000 then iterates back to stage 1022, attempting to fit that item (i.e. that did not fit on the previous row) and subsequent items on the new row. When all the items in a group have been positioned (no to stage 1032) but there are still remaining items to be displayed on the page (yes to stage 1036), in one embodiment a new row is started for the next group (i=i+1 and j=j+1 in stage 1040) and method 1000 iterates back to stage 1010. (Optionally empty space at the end of the finished row may be redistributed, provided there is still a visual separation before the next group of items, for example a group separator occupying width). In another embodiment, where a new row is not necessarily started for the next group, method 1000 iterates back to stage 1011 after a no to stage 1032 and a yes to stage 1036. If at stage 1014, a given group separator does not fit on the current row (no to stage 1014), then method 1000 optionally continues with stage 1024 redistributing any leftover space for example as described above with reference to stage 208. The next row is then processed (i=i+1) in stage 1044, with the available row width for the next row determined in stage 1046 for example as described above with reference to stage 202. Method 1000 then attempts to fit the given group separator on the next row, iterating back to stage 1014. Once all the items to be displayed on the page have been positioned (no to stage 1036), the page is prepared for display in stage 1038, for example as described above with reference to stage 210 or 708.

Optimizing the number of items for a given display area, in accordance with some embodiments of the present invention described herein has various advantages including any of the following inter-alia:

Wasting less space in some cases, thereby providing room for larger images and/or more images (whichever is preferred or both).

Larger images are in some cases more informative (can see labels and inscriptions on the image), are in some cases better recognized, and may in some cases have more consumer appeal from a marketing perspective.

More items per page has the following advantages in some embodiments:
  a) The items can be positioned in fewer pages, thus less clicking and navigation is needed in some cases to locate a certain item, to locate a group of items or to review the entire list of items.
  b) More items per page also implies in some cases, a flatter hierarchy, meaning that if there are less pages, a less elaborate hierarchy may be needed to organize the items.
  c) A better comparison platform is provided in some cases—i.e. when one can see more items next to one another, one can get in some cases a better understanding of the complete range or variety of a single type of items. For example, being able to see all the chocolate flavored ice creams from cheapest to most expensive in the same display area is very helpful in deciding which chocolate flavored ice-cream provides the best value.
  d) Less scrolling—More items per page means in some cases less need for scrolling (overall page length is in some cases reduced).

An example of one embodiment of the invention is now provided in more detail. For simplicity of description, a number of assumptions are made in the following example which do not necessarily apply to all embodiments of the invention. In the following example it is assumed that the items to be arranged include group separators and products. In the following example, it is assumed that the group separator cell width is constant and that the product cell width is based on the width of an image of the product. In the following example, it is assumed that the group separator can be placed in any position in the row. In the following example, it is assumed that system 100 includes a server client configuration as in FIG. 1A. In the following example it is assumed that the available display area (area of the page) and available row width are based on the screen area and screen width respectively at client 170. In the following example, it is assumed that the available row width is constant for each row. In the following example it is assumed that there is a comparison between the accumulated row width (widths of all items already arranged) plus the width of the current item being arranged and the available row width (width of row prior to arrangement of any items). However a comparison between the width of the item being arranged and the remaining row width (where remaining row width equals the width of the row prior to arrangement of any items less the widths of all items already arranged) would have been equally valid. It should be apparent to the reader that the following example is only one of many ways to implement the above described invention.

In this example:

Sw stands for Shelf width (a shelf being the aforementioned page and the shelf width being the aforementioned available row (display) width), for example in pixels.

Rw stands for the width occupied by already positioned items in the row (i.e. accumulated row width), for example in pixels.

Gw stands for Group separator width.

Offline Preparations:

For each product image

Store image width in database

Shelf Arrangement:

Get designated shelf area from client

Set Sw to designated shelf width in pixels

Set Rw to zero

Set Gw to constant group separator cell width (for example 120 pixels)

For each product group from product group list do

```
{
    If (Rw plus Gw is less than Sw)
    {
        Add the current group separator cell to the shelf row
        and raise Rw by Gw
    }
    Else
    {
        Add the current group separator cell to the next shelf
        row and set Rw to Gw
    }
    For each product in the current group product list do
    {
        Set Pw to the product image width in pixels
        If (Rw plus Pw is less than Sw)
        {
            Add the current product cell to the shelf row and
            raise Rw by Pw
        }
        Else
        {
            Add the current product cell to the next row and
            set Rw to Pw
        }
    }
}
```

In the above implementation, the system (for example server 110) starts by reviewing all images, storing their widths in database 120. As mentioned before, the width information for each image may be read from the image file format of some image formats.

The next stage is for the system (for example server 110) to get the width of the display area (referred to as 'shelf area' in the code above) from client 170. The shelf width (i.e. available row width) is stored in a variable named 'Sw'. The variable 'Rw', representing the total width of already positioned items in a given row (i.e. accumulated width), is initially set to 0. The variable 'Gw', representing the width of the group separator is set, for example, to 120 pixels. The group separator width is set to be constant in this example. The system (for example server 110) then retrieves items from the data base, one by one, and performs the following operations for each such item. First system 100 checks whether there is enough room for a group separator in the current row, since system 100 is in the stage of adding a new group. This check is done by seeing if the sum of the group separator width (Gw) and the accumulated row width (Rw) is bigger or smaller than the available width for display (Sw). If there is enough room (i.e. the sum is bigger), the separator is added to the current row. If there is not enough room in the row, the separator is added at the beginning of the next row. After the group separator is added, the system (for example server 110) loops through all the product-items that relate to this group. The product width of the image of each currently examined product-item in turn, is stored in the variable Pw. System 100 (for example server 110) checks if the accumulated row width (Rw) plus the current product-item image's width (Pw) fit within the shelf width (Sw). If the accumulated row width (Rw) plus the current product-item image's width (Pw) fits within the shelf width, system 100 (for example server 110) moves on to the next item. If the accumulated row width (Rw) plus the current product-item image's width (Pw) does not fit, system 100 (for example server 110) sets the position of the product-item image in the beginning of the next row. System 100 (for example server 110) will in such way go through all the items and all the groups until their position in the display has been determined.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

While the invention has been shown and described with respect to particular embodiments, it is not thus limited. Numerous modifications, changes and improvements within the scope of the invention will now occur to the reader.

The invention claimed is:

1. A computer-based method for arranging items for display, comprising:
providing a plurality of items for arrangement for display on at least one page;
arranging said plurality of items in rows on said at least one page, wherein said arranging on at least one of said pages include: determining cell widths which differ from one another for at least two items which are arranged on said page, and for at least one row on said page arranging at least two items on said row;
checking whether a current item can be accommodated on a current row;
if said current item can be accommodated on said current row, arranging said item for display on said current row; otherwise if said current item can not be accommodated on said current row, arranging said current item for display on a subsequent row which now becomes current.

2. The method of claim 1, wherein said current item can be accommodated on said current row if a remaining row width of said current row is at least equal to a cell width of said current item.

3. The method of claim 1, wherein said current item can be accommodated on said current row if a remaining row width of said current row is at least equal to a cell width of said current item and if a number of items already arranged in said current row is less than a predefined fixed number of items allowed for said current row.

4. The method of claim 3, wherein said predefined fixed number of items is identical for all rows on said page.

5. The method of claim 1, wherein said current item can not be accommodated on said current row, if said current row already includes at least one already arranged item and said current item is a group separator associated with items in a different group than said at least one already arranged item.

6. The method of claim 1, further comprising:
if a remaining width of said current row is greater than zero but cannot accommodate said current item, redistributing empty space within said current row.

7. The method of claim 1, wherein said arranging on said at least one of said pages further includes: determining row heights wherein row heights for at least two rows on said page differ from one another.

8. The method of claim 1, wherein each item arranged for display on a same row on said page has an identical cell width.

9. The method of claim 8, wherein a number of items arranged in one row is different from a number of items arranged in a different row on said page.

10. The method of claim 1, wherein said arranging on at least one of said pages includes: arranging images of said items and wherein a cell width for an item exceeds a width of an image of said item.

11. The method of claim 1, wherein said arranging on at least one of said pages further includes:
for at least one item, selecting an image for said item out of a plurality of available images for arrangement on said page.

12. The method of claim 11, wherein said selecting depends on a relative size of said item compared to at least one other of said plurality of items arranged on said page.

13. The method of claim 11, wherein said selecting is based on a characteristic of a user.

14. The method of claim 1, wherein said arranging on at least one of said pages includes:
for at least one item, arranging or not arranging at least one item related element depending on a characteristic of a user.

15. The method of claim 14, wherein said item related element is a customized label.

16. The method of claim 1, wherein said plurality of items includes at least one group separator item.

17. The method of claim 1, wherein said plurality of items includes at least one advertisement item.

18. The method of claim 1, wherein said plurality of items includes at least one item being offered for a transaction.

19. The method of claim 1, wherein said arranging on at least one of said pages further includes:
arranging items belonging to a group separately from items belonging to another group on said page.

20. The method of claim 19, wherein said arranging includes providing a visible gap between a last item in a group and a first item in a neighboring group.

21. A system for arranging items for display, comprising:
   a database configured to store items;
   a clustering module configured to provide a plurality of items which are to be displayed on at least one page, wherein at least one of said provided items is extracted from said database; and
   an arranger module configured to arrange said plurality of items in rows on said at least one page, wherein at least one row on at least one of said pages includes at least two of said plurality of items, said arranger module including a width module configured for at least one of said pages to determine cell widths which differ from one another for at least two items from said plurality which are arranged on said page and for at least one row on said page arranging at least two items on said row;
   wherein said arranger module is further configured to check whether a current item can be accommodated on a current row;
   if said current item can be accommodated on said current row, arranging said item for display on said current row and otherwise arranging said current item for display on a subsequent row which now becomes current.

22. The system of claim 21, wherein said arranger module further comprises:
   an image selector configured to select from a plurality of images stored in said database for a same item.

23. The system of claim 21, wherein said arranger module further comprises:
   a group divide module configured to visually separate on said page at least two groups of items from one another.

24. A non-transitory computer readable medium storing a computer readable program executable by a computer for causing the computer to perform a process of arranging items for display, the process comprising:
   providing a plurality of items for arrangement for display on at least one page;
   arranging said plurality of items in rows on said at least one page, wherein said arranging on at least one of said pages include: determining cell widths which differ from one another for at least two items which are arranged on said page, and for at least one row on said page arranging at least two items on said row;
   checking whether a current item can be accommodated on a current row;
   if said current item can be accommodated on said current row, arranging said item for display on said current row;
   otherwise if said current item can not be accommodated on said current row, arranging said current item for display on a subsequent row which now becomes current.

25. A computer program product comprising a non-transitory computer readable medium storing computer readable program code for causing a computer to perform a process of arranging items for display, the computer program product comprising:
   computer readable program code for causing the computer to provide a plurality of items for arrangement for display on at least one page;
   computer readable program code for causing the computer to arrange said plurality of items in rows on said at least one page, wherein said arranging on at least one of said pages include: determining cell widths which differ from one another for at least two items which are arranged on said page, and for at least one row on said page arranging at least two items on said row;
   computer readable program code for causing the computer to check whether a current item can be accommodated on a current row;
   if said current item can be accommodated on said current row, arranging said item for display on said current row;
   otherwise if said current item cannot be accommodated on said current row, arranging said current item for display on a subsequent row which now becomes current.

* * * * *